(12) United States Patent
Ono

(10) Patent No.: US 11,475,336 B2
(45) Date of Patent: Oct. 18, 2022

(54) INFORMATION PROCESSING SYSTEM, INFORMATION PROCESSING METHOD, AND RECORDING MEDIUM

(71) Applicant: Sony Corporation, Tokyo (JP)

(72) Inventor: Hideyuki Ono, Minato-ku (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/251,051

(22) PCT Filed: Jul. 11, 2019

(86) PCT No.: PCT/JP2019/027606
§ 371 (c)(1),
(2) Date: Dec. 10, 2020

(87) PCT Pub. No.: WO2020/017438
PCT Pub. Date: Jan. 23, 2020

(65) Prior Publication Data
US 2021/0256405 A1 Aug. 19, 2021

(30) Foreign Application Priority Data
Jul. 18, 2018 (JP) .............................. JP2018-134713

(51) Int. Cl.
*G06F 15/16* (2006.01)
*G06N 5/04* (2006.01)
*H04L 67/306* (2022.01)

(52) U.S. Cl.
CPC ........... *G06N 5/043* (2013.01); *H04L 67/306* (2013.01)

(58) Field of Classification Search
CPC .. H04L 41/046; H04L 67/306; H04L 47/2483

USPC ................................................... 709/201, 202
See application file for complete search history.

(56) References Cited

U.S. PATENT DOCUMENTS

| 2004/0210661 | A1* | 10/2004 | Thompson | ............ | H04L 67/306 |
| | | | | | 709/228 |
| 2014/0244744 | A1 | 8/2014 | Lyren | | |
| 2016/0119478 | A1* | 4/2016 | Sharpe | .................... | H04W 4/21 |
| | | | | | 379/265.09 |

FOREIGN PATENT DOCUMENTS

| JP | 2001-51956 A | 2/2001 |
| JP | 2001-318856 A | 11/2001 |
| JP | 2002-7366 A | 1/2002 |
| JP | 2003-58423 A | 2/2003 |
| JP | 2015-35140 A | 2/2015 |
| JP | 2015-60344 A | 3/2015 |
| WO | WO 02/077897 A1 | 10/2002 |

OTHER PUBLICATIONS

International Search Report dated Oct. 1, 2019 in PCT/JP2019/027606 filed on Jul. 11, 2019, citing documents AO and AP therein, 1 page.

* cited by examiner

*Primary Examiner* — Wing F Chan
*Assistant Examiner* — Andrew Woo
(74) *Attorney, Agent, or Firm* — Oblon, McClelland, Maier & Neustadt, L.L.P.

(57) ABSTRACT

An information processing system includes a control unit (200) that controls: a personal agent personalized to a user; and a group agent that provides support for a group made up of a plurality of users corresponding to a plurality of the personal agents.

19 Claims, 17 Drawing Sheets

INFORMATION PROCESSING SYSTEM, INFORMATION PROCESSING METHOD, AND RECORDING MEDIUM

TECHNICAL FIELD

The present disclosure relates to an information processing system, an information processing method, and a recording medium.

BACKGROUND ART

In recent years, an agent system that recommends contents and actions according to the user's question or request, or context using a smartphone, a tablet terminal, a wearable device, or a dedicated terminal such as a home agent has been known.

For example, PTL 1 below discloses a method of causing each agent itself to retain principles which are the ethical concept representing the purpose of activities of the agent as a method of creating a community which is a set of agents that perform activities to achieve the purpose by being distributed on a network and communicating with each other. In the system described in PTL 1, it is possible to distribute information that could not be predicted in advance by inquiring information to an agent in the community.

PTL 2 below discloses a method of monitoring the content of communication between agents that perform activities to achieve the purpose by being distributed on a network and communicating with each other to extract principles and generating a community characterized by the principles when the same principles are communicated to monitor the content of communication between agents with less computation.

PTL 3 below discloses a voice agent system that confirms with a user whether implicit preference information estimated from a purchase history is true by a conversation.

Regarding management of information related to a family to which an individual belongs, for example, PTL 4 below discloses a business support system in a financial institution that manages account information of a certain range of close relatives such as a family, relatives, or clans using a family ID even if the addresses or the surnames are different to support family business for a family.

CITATION LIST

Patent Literature

[PTL 1] JP 2001-51956A
[PTL 2] JP 2002-7366A
[PTL 3] JP 2015-35140A
[PTL 4] JP 2015-60344A

SUMMARY

Technical Problem

However, when users use agents dedicated for individual users, how to provide support optimized for a group in cooperation with a user-dedicated agent in a group to which a plurality of users belong.

Therefore, the present disclosure proposes an information processing system, an information processing method, and a recording medium capable of supporting a group to which a plurality of users using a personal agent belongs using a group agent.

Solution to Problem

According to the present disclosure, there is proposed an information processing system including: a control unit that controls: a personal agent personalized to a user; and a group agent that provides support for a group made up of a plurality of users corresponding to a plurality of the personal agents.

According to the present disclosure, there is proposed an information processing method for causing a processor to control: a personal agent personalized to a user; and a group agent that provides support for a group made up of a plurality of users corresponding to a plurality of the personal agents.

According to the present disclosure, there is proposed a recording medium having a program recorded thereon, the program causing a computer to function as a control unit that controls: a personal agent personalized to a user; and a group agent that provides support for a group made up of a plurality of users corresponding to a plurality of the personal agents.

Advantageous Effects of Invention

As described above, according to the present disclosure, it is possible to support a group to which a plurality of users using a personal agent belongs using a group agent.

Note that the effects described above are not necessarily limitative. With or in the place of the above effects, there may be achieved any one of the effects described in this specification or other effects that may be grasped from this specification.

DESCRIPTION OF EMBODIMENTS

Figure 1:
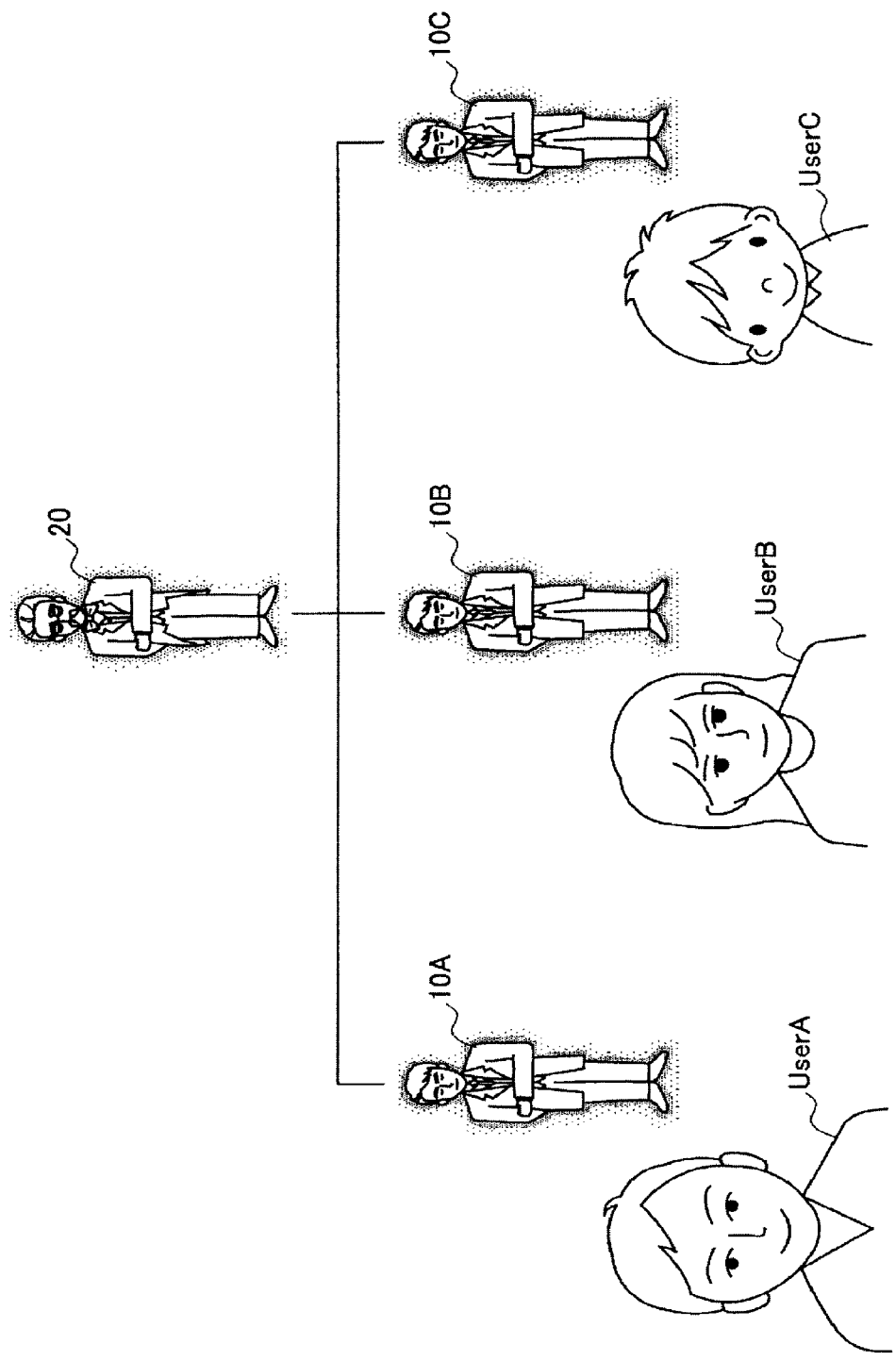
FIG. 1 is a diagram illustrating an overview of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview of information processing system of embodiment of present disclosure
2. Configuration example
2-1. Configuration of personal agent terminal 1
2-2. Configuration of group agent terminal 2
3. Examples
3-1. First example (support by group agent 20)
3-2. Second example (generation of group agent 20)
3-3. Third example (generation of new group agent 20 due to marriage or the like)
3-4. Fourth example (cancellation of group agent 20 due to divorce or the like)
3-5. Fifth example (when user belonging to group dies)
4. Modified example
5. Conclusion

1. OVERVIEW OF INFORMATION PROCESSING SYSTEM OF EMBODIMENT OF PRESENT DISCLOSURE

FIG. 1 is a diagram illustrating an overview of an information processing system according to an embodiment of the present disclosure. As illustrated in FIG. 1, an information processing system according to the present embodiment constructs an agent system including a personal agent 10 personalized exclusively for a user and a group agent 20 that provides support (for example, presentation of information, recommendation of actions, management of schedules, or setting of an alarm clock) for a group (for example, a predetermined body such as a family, a workplace, a club, or a school) to which a plurality of users belong. The group agent 20 can provide support optimized for a group while cooperating with personal agents 10A to 10C of users A to C belonging to a group. Among pieces of user information handled by the personal agent 10 (for example, schedule information, action history, operation history, preference information, and personal determination criterion data), some of the user information designated by a user, for example, may be closed to the group agent 20 (handled as personal information that can be known by the personal agent 10). In this way, the group agent 20 can access information (or information set to be open) other than the information set to be closed among the pieces of user information held by the personal agent 10.

Although the personal agent 10 and the group agent 20 are conceptualized and described as a steward-like character in FIG. 1, the character image is an example, and naturally, the present embodiment is not limited thereto.

Here, an agent is software that autonomously supports the action of a user, provides various pieces of information to a user, and talks to a user and can be operated by various information processing terminals. Specifically, the agent receives the request of the user from a camera of an information processing terminal, a microphone (hereinafter referred to as a mic), or an operation input unit and presents the result through a speaker or a display unit of the information processing terminal. The agent of the present embodiment may be a new agent system (referred to as a master system) that encourages users to change their action in order to approach problem solving from a long-term perspective, for example, as well as a general agent system that directly provides one session of a short-term response to users. Here, a master is the name (a master-like existence) of a virtual agent that encourages users to change their action spontaneously. For example, a master system automatically generates predetermined action rules (means for solving problems in a community, predetermined value criteria (that is, values), a predetermined rhythm of life, and the like) for each specific community or user and indirectly encourages the community or user to change the action on the basis of the action rules to solve the problems of the community. That is, while the user is acting according to the words of the master, even if the user is not aware of the action rules, the problems in the community are solved without realizing the same, the user can take actions conforming to the value criteria, and the situation of the community is improved.

The group agent 20 according to the present embodiment can be generated on the basis of a plurality of personal agents 10.

In the present embodiment, when users form a new group due to marriage or the like, it is possible to set the values of a new group agent 20 on the basis of the values (for example, represented by group determination criteria) of a previous group agent to which each user has belonged.

In the present embodiment, when a group is canceled due to divorce or the like of users, it is possible to remove a specific user (specifically, the personal agent 10 of the user) and to generate a new group agent that takes over the criteria of a group to which the specific user has belonged.

In the present embodiment, when a user dies, it is possible to erase cooperation with the personal agent 10 of the user in a group to which the user belongs, initialize the terminal of the personal agent 10, and copy the personal agent 10 in a referenceable storage area of the group agent 20 as a read-only agent.

Figure 2:
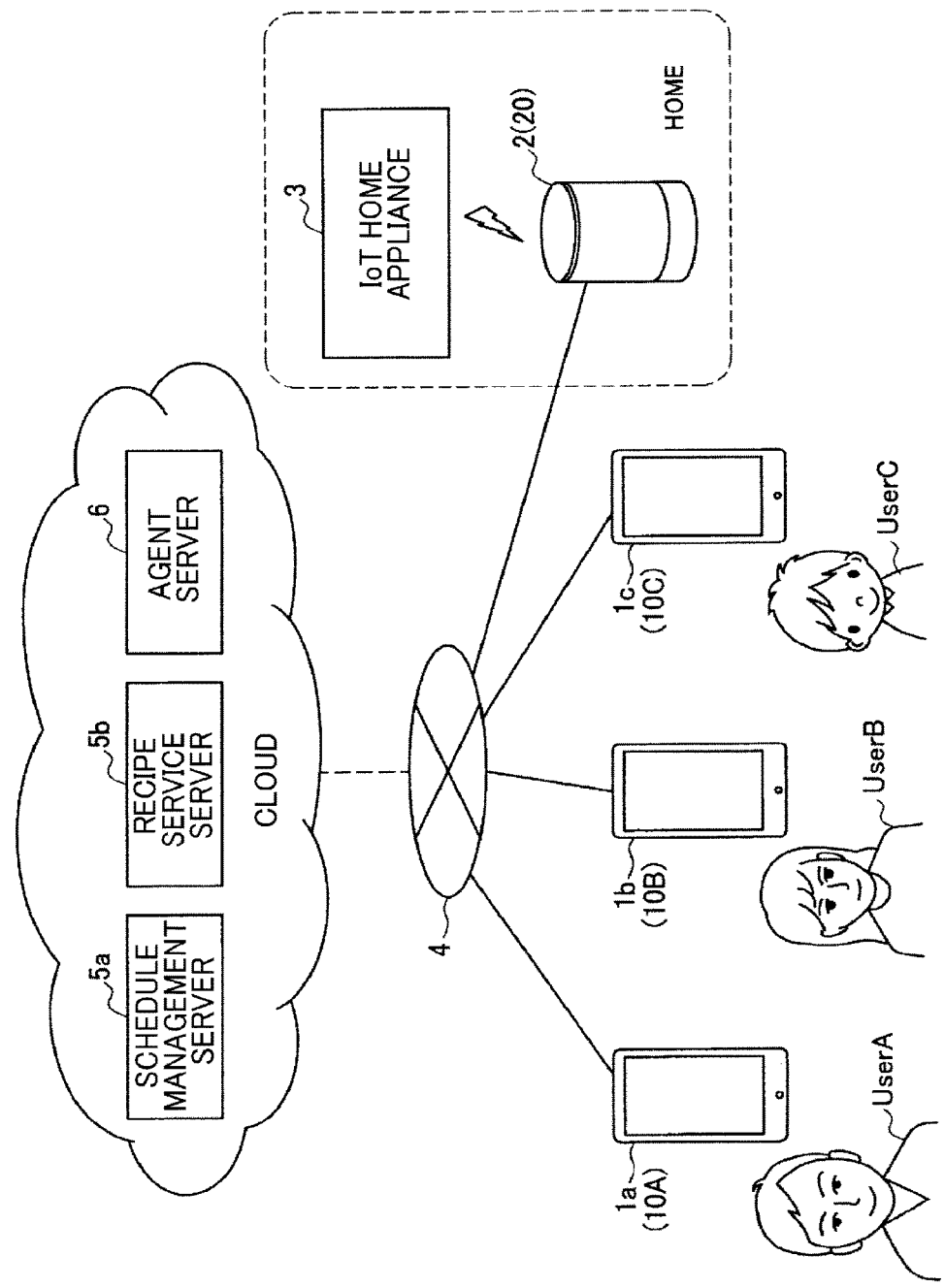
FIG. 2 is a diagram illustrating an example of an entire configuration of the information processing system according to the present embodiment.

Next, an entire configuration of an information processing system according to the present embodiment will be described with reference to FIG. 2. FIG. 2 is a diagram illustrating an example of an entire configuration of an information processing system according to the present embodiment.

As illustrated in FIG. 2, an information processing system according to the present embodiment includes a personal agent terminal 1 in which the personal agent 10 operates and a group agent terminal 2 in which the group agent 20 operates. The personal agent terminal 1 and the group agent terminal 2 can communicate with each other via a network 4, for example, to transmit and receive data. The form of an information processing terminal in which the personal agent 10 or the group agent 20 operates is not particularly limited, and an information processing terminal possessed by an individual, such as, for example, a smartphone, a tablet terminal, a wearable device (HMD (head mounted display), a smart band, a smart watch, a smart earphone, or a smart neck speaker), a PC, or the like may be used as the personal agent 10. Moreover, an information processing terminal shared by a group, for example, a voice recognition terminal (a home terminal) placed on a living room or the like, a TV device, or a home projector may be used as the group agent 20.

The personal agent 10 and the group agent 20 may operate on the same information processing terminal. The group agent 20 may operate on a server (an agent server 6 illustrated in FIG. 2) on a network.

All or some of software components of the personal agent 10 or the group agent 20 may be provided in an information processing terminal and may be provided in a server (the agent server 6) on a network.

The personal agent 10 and the group agent 20 may use various external services (a schedule management server 5a and a recipe service server 5b) such as a schedule service or a recipe service and acquire information from an external device such as an IoT (Internet of Things) home appliance 3 as necessary.

Hereinabove, the information processing system according to an embodiment of the present disclosure has been described. Next, a specific configuration of each device included in the information processing system according to the present embodiment will be described with reference to the accompanying drawings.

2. CONFIGURATION EXAMPLE

2-1. Configuration of Personal Agent Terminal 1

Figure 3:
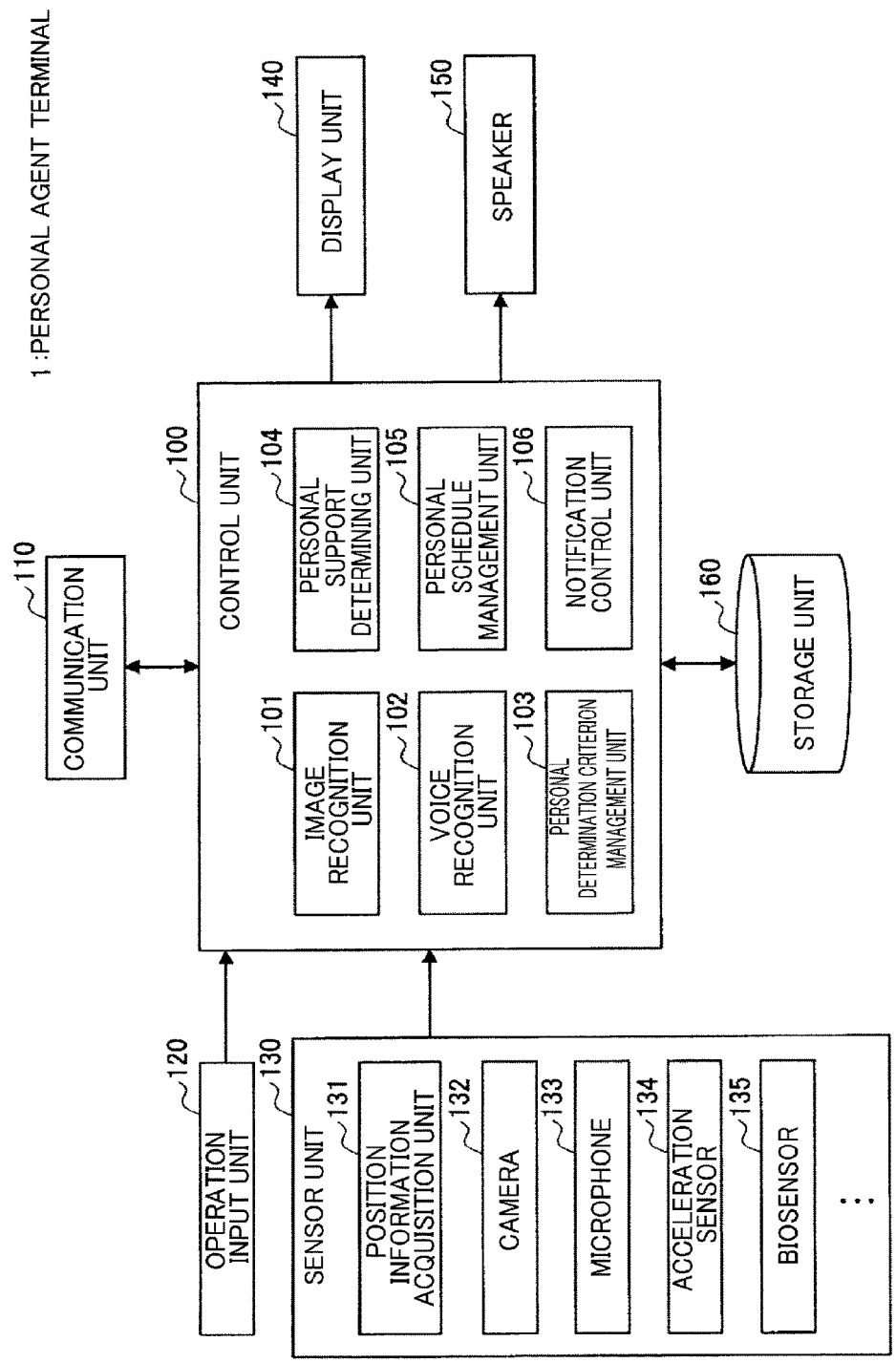
FIG. 3 is a block diagram illustrating an example of a configuration of a personal agent terminal according to the present embodiment.

FIG. 3 is a block diagram illustrating an example of a configuration of the personal agent terminal 1 according to the present embodiment. As illustrated in FIG. 3, the personal agent terminal 1 includes a control unit 100, a communication unit 110, an operation input unit 120, a sensor unit 130, a display unit 140, a speaker 150, and a storage unit 160.

The control unit 100 functions as an arithmetic processing device and a control device and controls an overall operation of the personal agent terminal 1 according to various programs. The control unit 100 is realized as an electronic circuit such as, for example, a CPU (central processing unit) or a microprocessor. The control unit 100 may include a ROM (read only memory) that stores programs to be used, calculation parameters, and the like and a RAM (random access memory) that temporarily stores parameters and the like that change as appropriate.

The control unit 100 according to the present embodiment also functions as an image recognition unit 101, a voice recognition unit 102, a personal determination criterion management unit 103, a personal support determining unit 104, a personal schedule management unit 105, and a notification control unit 106, whereby the operation of the personal agent 10 is realized.

The image recognition unit 101 analyzes captured images captured by a camera 132 of the personal agent terminal 1, for example, and performs face recognition and the like of a user.

The voice recognition unit 102 analyzes voice data collected by a mic 133 of the personal agent terminal 1, for example, and perform speaker recognition, speaking voice recognition, and the like.

The personal determination criterion management unit 103 generates and registers determination criteria (hereinafter referred to as "personal determination criteria" in this specification) when providing support for an individual user. The personal determination criteria have the same meaning as values, and more specifically, are used to provide support suitable for a user (the values thereof) when an agent provides certain support (recommendation of actions, presentation of information, suggestions, management of schedule, or setting of an alarm clock) to a user. The personal determination criteria may be preset as the initial state of the personal agent 10 (software) (that is, a personal agent having predetermined default values is prepared), a user may input main determination criterion scores, and the personal determination criteria may be generated automatically on the basis of the result of questionnaire answered by a user (for example, an indirect question may be asked to acquire the user's preference tendency). It is not necessary that all items present as the personal determination criterion items are preset or input by the user, a flat value (for example, 0.5 may be input as a flat value when a score of 0 to 1 is provided) may be automatically input for items which are not set.

Here, an example of the personal determination criteria according to the present embodiment is illustrated in Tables 1 and 2 below. Table 1 is an example of personal determination criteria of a personal agent 10A used by user A (for example, "father"). Table 2 is an example of personal determination criteria of a personal agent 10B used by user B (for example, "mother"). The personal determination criteria may be provided for each determination target (for each evaluation target matter such as "food shopping" and "schedule priority"). Moreover, each item of the personal determination criteria may be different for respective evaluation targets. The score of each item of the personal determination criteria may be set to a score of 0 to 1, and the score of each item may be adjusted within a predetermined total value (for example, the value of each item may be distributed according to the user's preference tendency so that the total score is 10).

TABLE 1

| Personal Determination Criterion (User A: Father) | Cheapness | Deliciousness | Safety | Convenience |
| --- | --- | --- | --- | --- |
| Food Shopping Determination Criterion | 0.2 | 0.2 | 0.1 | 0.5 |
| . . . | | | | |

TABLE 2

| Personal Determination Criterion (User B: Mother) | Cheapness | Deliciousness | Safety | Convenience |
|---|---|---|---|---|
| Food Shopping Determination Criterion | 0.2 | 0.5 | 0.2 | 0.1 |
| ... | | | | |

The personal determination criterion management unit 103 may update the personal determination criteria according to the user's feedback, an action history, or the like and perform learning so that the personal determination criteria gradually conform to the values of an individual user (that is, personalization of agents). For example, the score of the personal determination criteria may be corrected according to the user's feedback (whether or not to accept the suggestions) to the suggestions of the personal agent 10 according to the personal determination criteria.

The personal support determining unit 104 determines the support for an individual user (the content, the timing, or the like of support such as which support is provided) on the basis of the personal determination criteria. For example, when a user needs to shop, the personal support determining unit 104 refers to the personal determination criteria of the user and supports shopping (action) in an inexpensive store if the score of "cheapness" is the highest (for example, suggest shopping at the store). When determining the content or the timing of support, the personal support determining unit 104 may make a determination with reference to the user's schedule information.

The personal schedule management unit 105 has a function of managing the schedule of an individual user. The schedule information is considered when action support is provided by an agent. The personal schedule management unit 105 may perform schedule management using the schedule management server 5a which is an external service. Moreover, the personal schedule management unit 105 may register a schedule (for example, shopping at a predetermined store on the way home from work) associated with the action support determined by the personal support determining unit 104.

The notification control unit 106 controls the display unit 140 and the speaker 150 so as to provide various notifications to a user. Specifically, the notification control unit 106 according to the present embodiment performs control of sending a notification of the support (for example, shopping at a predetermined store or guidance to a predetermined place) for an individual user determined by the personal support determining unit 104 from the display unit 140 and the speaker 150. Since the notification based on the support for an individual user determined by the personal support determining unit 104 is a notification from the personal agent 10, the notification control unit 106 may display the image of a predetermined agent character and output the voice of a predetermined agent character when sending the notification.

(Communication Unit 110)

The communication unit 110 can connect to an external device via cable or wirelessly to transmit and receive data. For example, the communication unit 110 connects to the network 4 via cable or wirelessly to transmit and receive data to and from various servers (the schedule management server 5a, the recipe service server 5b, the agent server 6, and the like) on the network. The communication unit 110 communicates with the network 4, for example, via a wired/wireless LAN (local area network), a Wi-Fi (registered trademark), Bluetooth (registered trademark), a mobile communication network (LTE (long term evolution)), or 3G (third generation mobile communication method).

(Operation Input Unit 120)

The operation input unit 120 detects an operation input to the personal agent terminal 1 by the user and inputs the same to the control unit 100. The operation input unit 120 may be a touch sensor, a pressure sensor, or a proximity sensor, for example, and may be a physical configuration such as a button, a switch, and a lever.

(Sensor Unit 130)

The sensor unit 130 is various sensors that sense a user state or a surrounding environment and inputs the sensed data to the control unit 100. The sensor unit 130 may include, for example, a position information acquisition unit 131 (that can perform outdoor positioning using GPS (global positioning system) or the like and indoor positioning using Bluetooth, Wi-Fi, or the like), a camera 132, a mic 133, an acceleration sensor 134, and a biosensor 135 (for example, detection of body temperature, veins, heartbeat, respiration, sweating, blood pressure, brain waves, electrooculogram, myoelectric value, eye movement, line of sight, and the like). The specific example of the sensor unit 130 is not limited to the examples illustrated in FIG. 3, and other examples may include a pressure sensor, a ranging sensor, a thermo sensor, an ultrasonic sensor, a gyro sensor, a geomagnetic sensor, and an environment sensor (for example, detection of luminance, temperature, and humidity).

(Display Unit 140)

The display unit 140 has a function of presenting various pieces of notification information to a user according to the control of the control unit 100. The display unit 140 is realized, for example, as a LCD (liquid crystal display) device, an OLED (organic light emitting diode) device, and the like. Moreover, the display unit 140 may be realized as a projector that projects images.

(Speaker 150)

The speaker 150 has a function of outputting sound information according to the control of the control unit 100. For example, the speaker 150 outputs various pieces of notification information for the user by sound. The speaker 150 may be a directional speaker. When a directional speaker is used, only the user can hear the sound.

(Storage Unit 160)

The storage unit 160 is realized as a ROM (read only memory) that stores programs, calculation parameters, and the like used for processing of the control unit 100 and a RAM (random access memory) that temporarily stores parameters and the like that change as appropriate.

Hereinabove, a configuration example of the personal agent terminal 1 according to the present embodiment has been described in detail. The configuration illustrated in FIG. 3 is an example and the present embodiment is not limited thereto. For example, the personal agent terminal 1 may include a plurality of devices, and at least some of the functions of the control unit 100 may be realized by an external device (for example, a server).

2-2. Configuration of Group Agent Terminal 2

Figure 4:
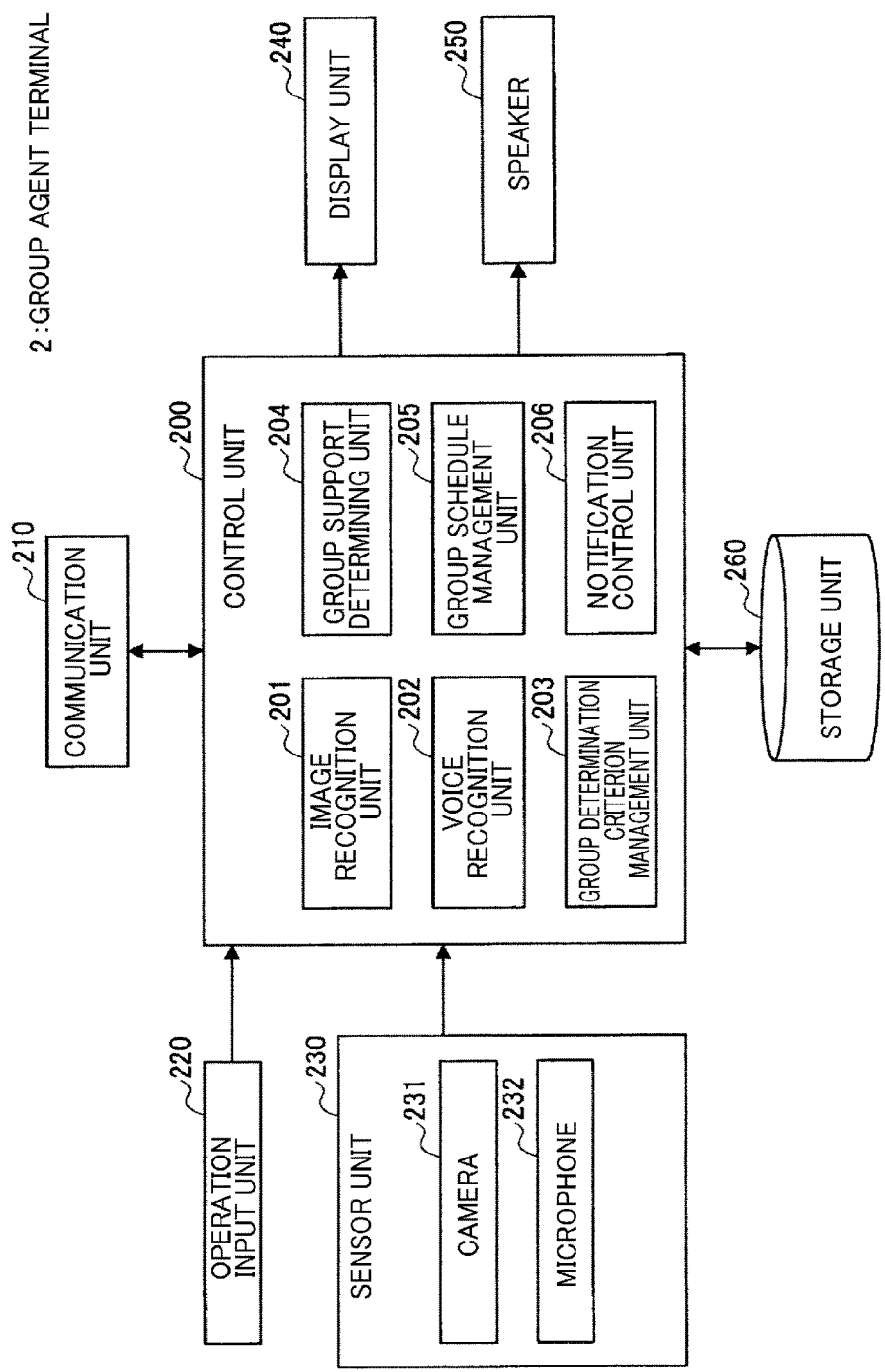
FIG. 4 is a block diagram illustrating an example of a configuration of a group agent terminal according to the present embodiment.

FIG. 4 is a block diagram illustrating an example of a configuration of the group agent terminal 2 according to the present embodiment. As illustrated in FIG. 4, the group agent terminal 2 includes a control unit 200, a communication unit 210, an operation input unit 220, a sensor unit 230, a display unit 240, a speaker 250, and a storage unit 260.

The control unit 200 functions as an arithmetic processing device and a control device and controls an overall operation of the group agent terminal 2 according to various programs. The control unit 200 is realized as an electronic circuit such as, for example, a CPU (central processing unit) or a microprocessor. The control unit 200 may include a ROM (read only memory) that stores programs to be used, calculation parameters, and the like and a RANI (random access memory) that temporarily stores parameters and the like that change as appropriate.

The control unit 200 according to the present embodiment also functions as an image recognition unit 201, a voice recognition unit 202, a group determination criterion management unit 203, a group support determining unit 204, a group schedule management unit 205, and a notification control unit 206, whereby the operation of the group agent 20 is realized.

The image recognition unit 201 analyzes captured images captured by a camera 231 of the group agent terminal 2, for example, and performs face recognition and the like of a user.

The voice recognition unit 202 analyzes voice data collected by a mic 232 of the group agent terminal 2, for example, and perform speaker recognition, speaking voice recognition, and the like.

The group determination criterion management unit 203 generates and registers determination criteria (hereinafter referred to as "group determination criteria" in this specification) when providing support for a group. The group determination criteria have the same meaning as values, and more specifically, are used to provide support suitable for a group (the values thereof) when an agent provides certain support (recommendation of actions, presentation of information, or suggestions) to a group. The group determination criteria may be selected from criteria (presets) prepared in advance as goals by a user belonging to a group (that is, a plurality of group agents having different types of values are prepared). For example, even if individual members want to eat delicious food, when a family thinks safety is the best, such group determination criteria as illustrated in Table 3 are selected from presets as determination criteria for meals.

TABLE 3

| Group Determination Criterion (Family) | Cheapness | Deliciousness | Safety | Convenience |
|---|---|---|---|---|
| Food Shopping Determination Criterion | 0.1 | 0.1 | 0.7 | 0.1 |
| . . . | | | | |

The group determination criterion management unit 203 may acquire personal determination criteria of a specific user among a plurality of users belonging to a group from the personal agent terminal 1 and set the same as group determination criteria. Here, when personal determination criteria are acquired from the personal agent terminal 1, information set in advance to be closed to the personal agent terminal 1 may not be applied to group determination criteria (specifically, the closed information is not transmitted from the personal agent terminal 1 to the group agent terminal 2). For example, as determination criteria for "schedule priority", although a certain user has a high ranking (high score) for "a live concert of an idol singer", since the user does not want to open the hobby for such an idol singer to a family (an example of a group), the user sets information including a keyword of "idol singer" to be closed in advance. In this way, even if the personal determination criteria of the user are applied to the group determination criteria, it is possible to prevent "a live concert of an idol singer" from being included in the item of the determination criteria and prevent a personal determination criterion in which the determination criterion score of "a live concert of an idol singer" is high from being applied to the group determination criteria (the personal determination criterion is closed for a group).

When the group determination criteria are set on the basis of the personal determination criteria of a specific user, the group determination criterion management unit 203 may update the group determination criteria according to the user's feedback, an action history, or the like and perform learning so that the group determination criteria gradually conform to the values of the specific user. For example, the score of the group determination criteria may be corrected according to a specific user's feedback (whether or not to accept the suggestions) to the suggestions of the group agent 20 to the group according to the group determination criteria.

When providing support for a group, the group support determining unit 204 determines the content, the timing, or the like of support on the basis of the group determination criteria. For example, the support for a group corresponds to responding to a request from a user, something based on the user context determined from the user's action and the like, and indirectly or directly encouraging the group to change actions based on the action rules in a community based on the master system. Moreover, the support for a group includes management of schedule of a group member (for example, adjustment of schedule of a family trip). For example, the group support determining unit 204 determines the menu for a dinner of a family from a conversation with a mother and determines the content of support by referring to the group determination criteria when requesting a group member to buy food as preparation (support for a dinner). For example, if the score of "cheapness" is the highest, shopping (action) at a store with a low price range is determined. Moreover, the group support determining unit 204 checks the schedule of a group member, extracts a member who has time for shopping, and makes a request.

The group schedule management unit 205 has a function of managing the schedule of each user belonging to a group. Specifically, the group schedule management unit 205 inquires the personal agent terminal 1 to check the schedule of each user as necessary on the basis of the group support determined by the group support determining unit 204.

The notification control unit 206 provides various notifications to each user belonging to a group on the basis of the group support determined by the group support determining unit 204 by controlling the display unit 140 and the speaker 150. Alternatively, the notification control unit 206 may transmit various notifications for each user belonging to a group to the personal agent terminal 1 via the communication unit 210 on the basis of the group support determined by the group support determining unit 204 and the personal agent terminal 1 may present the notifications from the personal agent 10 to the user.

(Communication Unit 210)

The communication unit 210 can connect to an external device via cable or wirelessly to transmit and receive data. For example, the communication unit 210 connects to the network 4 via cable or wirelessly to transmit and receive data to and from the personal agent terminal 1 and various servers (the schedule management server 5a, the recipe service server 5b, the agent server 6, and the like) via the network 4. The communication unit 210 communicates with the network 4, for example, via a wired/wireless LAN (local area network), a Wi-Fi (registered trademark), Bluetooth (registered trademark), a mobile communication network (LTE (long term evolution), or 3G (third generation mobile communication method)).

(Operation Input Unit 220)

The operation input unit 220 detects an operation input to the group agent terminal 2 by the user and inputs the same to the control unit 200. The operation input unit 220 may be a touch sensor, a pressure sensor, or a proximity sensor, for example, and may be a physical configuration such as a button, a switch, and a lever.

(Sensor Unit 230)

The sensor unit 230 is various sensors that sense a user state or a surrounding environment and inputs the sensed data to the control unit 200. The sensor unit 230 may include, for example, a camera 231 and a mic 232. For example, when the group agent terminal 2 is realized as a stationary voice recognition terminal (a home terminal) as illustrated in FIG. 2, the sensor unit 230 includes at least the mic 232 and may further include the camera 231, a ranging sensor, a thermo sensor, an ultrasonic sensor, and the like. Due to this, gesture input, user identification, and the like as well as voice input can be realized.

(Display Unit 240)

The display unit 240 has a function of presenting various pieces of notification information to a user according to the control of the control unit 200. The display unit 240 is realized, for example, as an LCD (liquid crystal display) device, an OLED (organic light emitting diode) device, and the like. Moreover, the display unit 240 may be realized as a projector that projects images.

(Speaker 250)

The speaker 250 has a function of outputting sound information according to the control of the control unit 200. For example, the speaker 250 outputs various pieces of notification information for the user belonging to a group by sound.

(Storage Unit 260)

The storage unit 260 is realized as a ROM (read only memory) that stores programs, calculation parameters, and the like used for processing of the control unit 200 and a RAM (random access memory) that temporarily stores parameters and the like that change as appropriate.

Hereinabove, a configuration example of the group agent terminal 2 according to the present embodiment has been described in detail. The configuration illustrated in FIG. 4 is an example and the present embodiment is not limited thereto. For example, the group agent terminal 2 may include a plurality of devices, and at least some of the functions of the control unit 200 may be realized by an external device (for example, a server). Moreover, the group agent terminal 2 may not include the display unit 240.

3. EXAMPLES

Next, examples of the information processing system according to the present embodiment will be described in detail.

3-1. First Example (Support by Group Agent 20)

First, an example of support for a group by the group agent 20 according to the embodiment will be described with reference to FIGS. 5 to 7 as a first embodiment.

The group agent 20 can cooperate with the personal agent 10 of each user belonging to a group to provide support optimized to the group. In this example, a case in which the group agent 20 provides support for a family dinner in cooperation with the personal agent 10 in a situation where a family of three, including a father, a mother, and a child each use the personal agent 10, and the family shares the group agent 20 will be described as an example.

Figure 5:
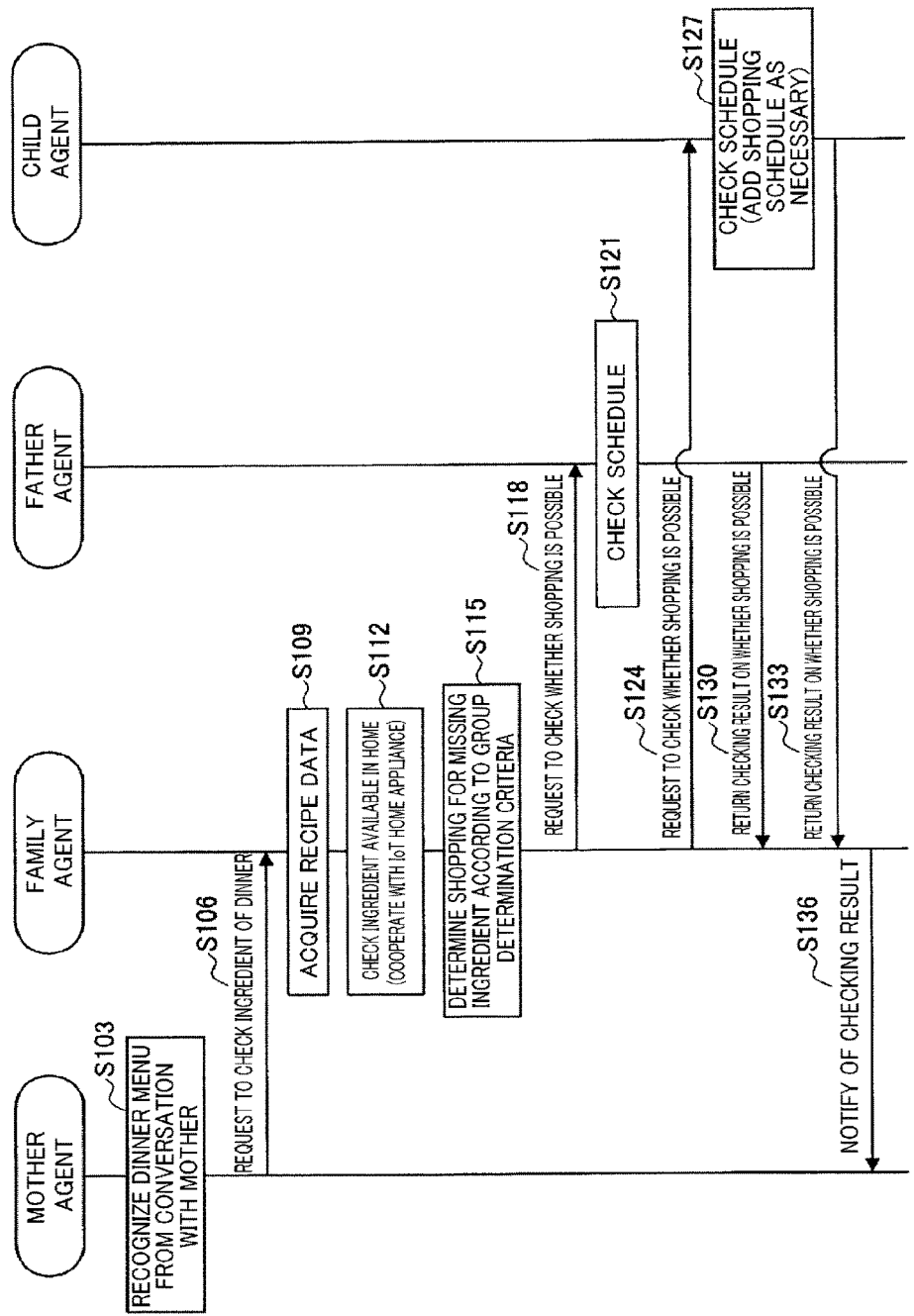
FIG. 5 is a flowchart illustrating an example of the flow of an operation process according to a first example of the present embodiment.
Figure 6:
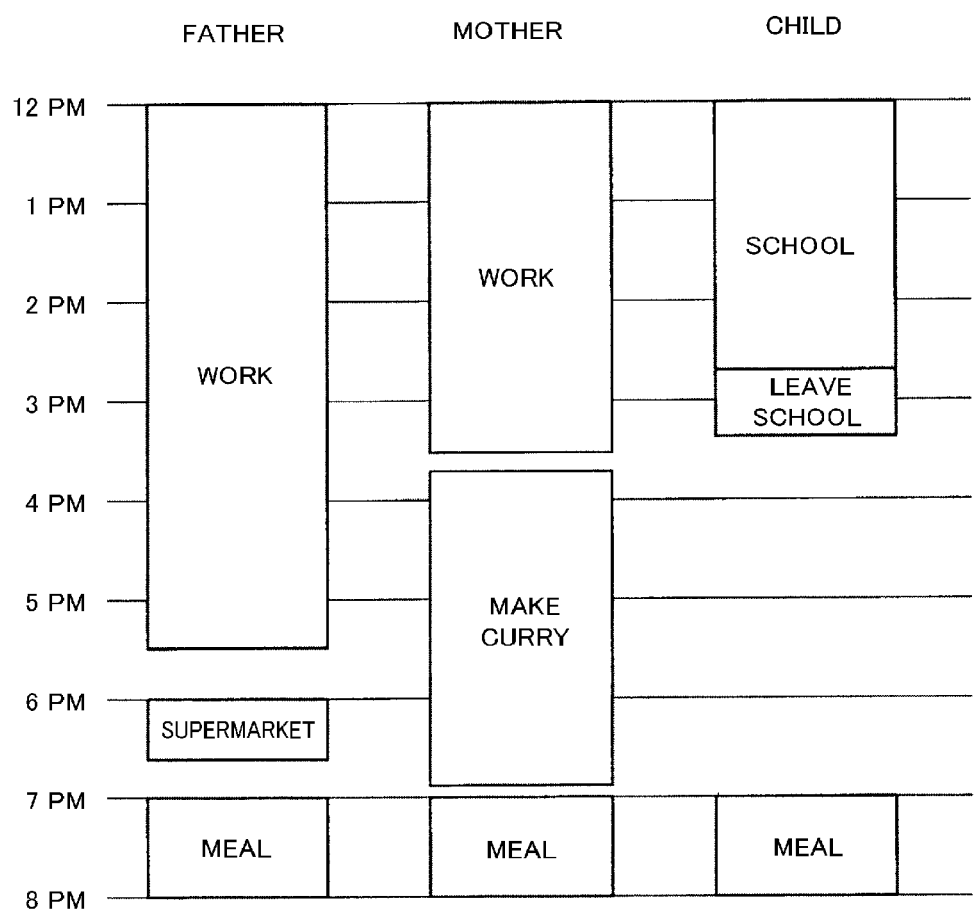
FIG. 6 is a diagram illustrating an example of schedules of a family according to the first example of the present embodiment.

FIG. 5 is a flowchart illustrating an example of the flow of an operation process according to this example. As illustrated in FIG. 5, first, a mother agent (a personal agent 10B) recognizes a dinner menu from a conversation with the mother (step S103). For example, when the mother speaks to the personal agent 10B (the personal agent terminal 1b) that "I want to make curry for my family tonight", the personal agent 10B acquires and analyzes a character string by voice recognition and analyzes that the character string is the context of a family dinner.

Subsequently, the mother agent responds to the mother that "check ingredients" and requests the family agent (the group agent 20) to check the ingredients of the recognized dinner menu "curry" (step S106).

Subsequently, the family agent acquires the recipe data of the dinner menu "curry" from the recipe service server 5b or the like in response to the request from the mother agent (step S109).

Subsequently, the family agent checks the ingredients available in the home by cooperating with the IoT home appliance 3 or the like (step S112). For example, when ingredients such as "curry roux, onions, carrots, and pork" are extracted from the recipe of "curry", the family agent acquires the image of the inside of a refrigerator which is an example of the IoT home appliance 3 and the image of the inside of a food shelf to perform image recognition to check whether ingredients are present.

Subsequently, the family agent determines whether or not to go shopping for missing ingredients according to "food shopping determination criterion" of the group determination criteria (step S115). For example, when carrots and pork are found in the image of the inside of the refrigerator but the other ingredients are not found, it is necessary to purchase the missing ingredients. Here, an example of "food shopping determination criterion" of the group determination criteria referred to when determining shopping is illustrated in Table 4 below.

TABLE 4

| Group Determination Criterion (Family) | Cheapness | Deliciousness | Safety | Convenience |
|---|---|---|---|---|
| Food Shopping Determination Criterion . . . | 0.4 | 0.3 | 0.2 | 0.1 |

In the example illustrated in Table 4, since the score of "cheapness" is the highest among the items of the food shopping determination criteria, the group support determining unit 204 determines as the first priority to purchase the missing ingredients at a supermarket with a low price range. As information on stores available in the neighborhood, an evaluation table as illustrated in Table 5 below can be obtained from the network.

TABLE 5

| Store Evaluation | Cheapness | Deliciousness | Safety | Convenience |
|---|---|---|---|---|
| OO Supermarket | 0.4 | 0.3 | 0.2 | 0.1 |
| XX Department | 0.1 | 0.5 | 0.3 | 0.1 |
| Mobile Convenience Store | 0.1 | 0.4 | 0.2 | 0.3 |

In the example illustrated in Table 5, the group support determining unit 204 determines "OO supermarket" in which the evaluation item of "cheapness" is higher than the other evaluation items among the evaluation items of each store as the place to purchase the missing ingredients. The group support determining unit 204 may select a store of which the tendency of the score of each item (cheapness, deliciousness, safety, and convenience) is closest to the group determination criteria (for example, a store in which the tendency of the score of "cheapness" and "deliciousness" is high or a store in which the tendency of the score of "convenience" and "deliciousness" is high). Moreover, when the score of "convenience" is the highest among the group determination criteria, a mobile convenience store (a mobile sales vehicle) where food can be bought immediately even if it is expensive or an instant food is selected. When the score of "deliciousness" is high, a department store that has expensive but delicious ingredients is selected.

Subsequently, the family agent confirms with the personal agent 10 of each user belonging to the group whether shopping at "OO supermarket" is possible on schedule (step S118 to step S133).

For example, if the family always eats dinner from 19:00, taking the cooking time and the time when the mother returns home into consideration, the family agent confirms with the personal agent 10 of each member of the family whether it is possible to purchase ingredients at "OO supermarket" by 16:00 (steps S118 and S124). The personal agent 10 of each member confirms the schedule (steps S121 and S127). Here, an example of the schedule of each member of the family is illustrated in FIG. 6. In this example, for example, it is assumed that the schedule shows that the father works full-time until 17:30, the mother works shortened until 15:30, and the child is at school until 14:30. Moreover, the father has a schedule to stop by "OO supermarket" on the way home from work. Moreover, the mother has a schedule to start preparing a dinner from around 16:00.

Subsequently, the personal agent 10 determines whether it is possible to purchase ingredients at "OO supermarket" by 16:00 in terms of time and place on the basis of the user's schedule and returns the determination result to the family agent. In this example, for example, a father agent (the personal agent 10A operating on the personal agent terminal 1*a*) knows that the father is supposed to stop by "OO supermarket" at 18:00 by referring to the father's schedule but replies to the family agent that the shopping is not in time because the time is too late (step S130). Moreover, a child agent (the personal agent 10C operating on the personal agent terminal 1*c*) checks (for example, by voice conversation) whether the child can stop by the supermarket since the child agent knows that the child returns on by passing near "OO supermarket" at 15:00 by referring to the child's schedule. When the child replies that the child can stop by the supermarket, the child agent adds a new schedule to stop by "00 supermarket" at 15:00 and replies to the family agent that the child can go shopping (step S133).

The family agent notifies the mother agent of the confirmation result (for example, ingredients are ready at 16:00) (step S136). Moreover, the mother agent notifies the mother of the received confirmation result.

In this way, the family agent (the group agent 20) can provide support such as purchase arrangement of missing ingredients by cooperating with the personal agent 10 of each member of the family regarding the family action such as the family dinner.

Since the user may not act as planned, for example, a case where a child plays forgetting to go shopping will be described with reference to FIG. 7. FIG. 7 is a flowchart illustrating an example of the flow of a support process when a child forgot to go shopping.

Figure 7:
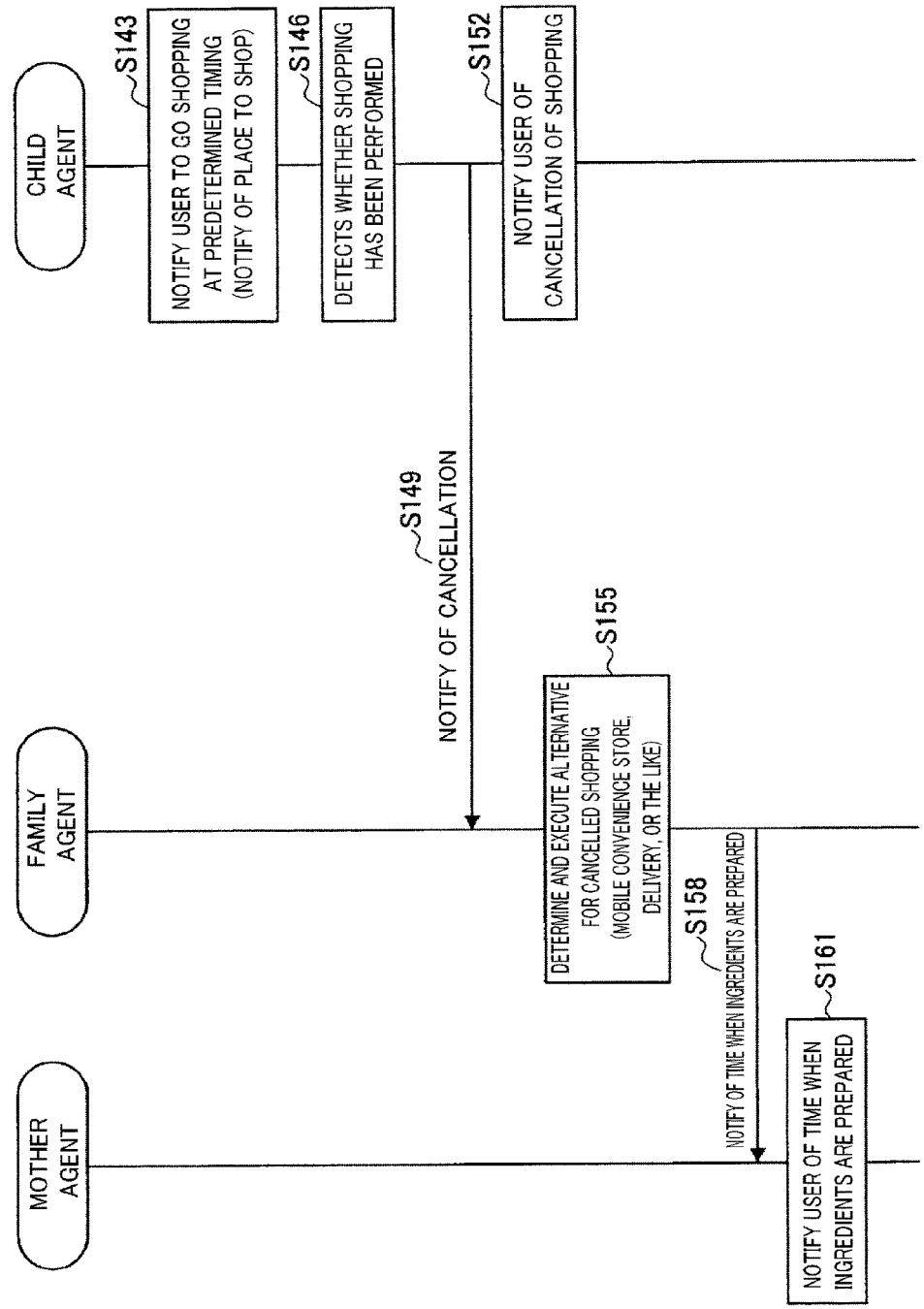
FIG. 7 is a flowchart illustrating an example of the flow of a support process when a child forgot to go shopping according to the first example of the present embodiment.

As illustrated in FIG. 7, first, the child agent notifies the user (child) to shop at "OO supermarket" at a predetermined timing (that is, according to the time of shopping newly registered in the schedule) (step S143). For example, the child agent may notify the user of guidance to the place to shop.

Subsequently, the child agent detects whether the child has shopped at "OO supermarket" (step S146). Specifically, the child agent can check whether the child has stopped by the supermarket on the basis of the position information of the child.

Subsequently, when the child has not stopped by the supermarket, the child agent notifies the family agent of cancellation of the shopping request (step S149).

Moreover, the child agent notifies the user (child) of cancellation of the shopping request (step S152).

Subsequently, the family agent determines and executes an alternative to the canceled shopping (step S155). For example, the family agent automatically requests the purchase of ingredients in a mobile convenience store where ingredients can be delivered to home by the time it will be in time to prepare dinner, for example, by prioritizing being timely rather than cheapness.

Subsequently, the family agent notifies the mother agent of the time when the ingredients are prepared (step S158) and the mother agent having received the notification notifies the user (mother) of the time when the ingredients are prepared (step S161).

In this way, even when the child forgot to go shopping, it is possible to prepare ingredients by an alternative.

From the above, for example, regarding the preparation of a family dinner, the support optimized for the family is obtained with the aid of the family agent (the group agent 20) and the mother can prepare the dinner with cooperation with the family.

3-2. Second Example (Generation of Group Agent 20)

Next, generation of the group agent 20 according to the present embodiment will be described in detail with reference to FIGS. 8 to 10.

When a plurality of personal agents 10 is present, the group agent 20 according to the present embodiment forms a group on the basis of the plurality of personal agents 10 and sets group determination criteria. Here, as an example, when a father and a mother each purchase the personal agent 10 (for example, an application of the personal agent 10 is acquired and downloaded on the personal agent terminal 1), a case of acquiring the group agent 20 (the family agent) cooperating with the personal agent 10 will be described. Moreover, when the group agent 20 is operated on the group agent terminal 2 (a home terminal or the like), the user may purchase and start a new group agent terminal 2 to prepare for connection to a home network, for example.

Figure 8:
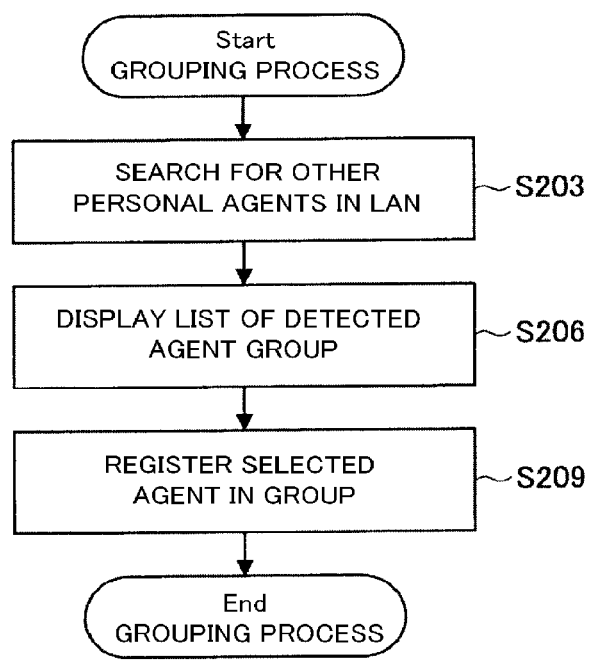
FIG. 8 is a flowchart illustrating an example of the flow of an operation process according to a second example of the present embodiment.

FIG. 8 is a flowchart illustrating an example of the flow of an operation process according to this example. As illustrated in FIG. 8, first, the group agent 20 searches for the personal agent 10 present in a network area (for example, in a LAN such as a home network) to be connected (step S203). Here, as an example, a case in which the group agent 20 is started by the group agent terminal 2 (a home terminal or the like), and the group agent terminal 2 detects the personal agent 10 from the home network will be considered (the personal agent 10A operating on the personal agent terminal 1a of the father connected to the home network or the personal agent 10B operating on the personal agent terminal 1b of the mother connected to the home network is detected). The group agent 20 may operate on the agent server 6, for example, without being limited to operating on the group agent terminal 2. In this case, for example, the user may connect to the agent server 6 from a smartphone or a PC to start the group agent 20, and the group agent 20 may detect the personal agent 10 from the home network of the user via the smartphone or a PC (an operation terminal).

Subsequently, the group agent 20 displays a list of a group of detected agents (step S206) and registers one or more agents selected by the user in a group (step S209). In this way, the group agent 20 and the personal agents 10 are associated and the personal agents 10 are grouped (generation of a family agent).

Subsequently, the group agent 20 sets group determination criteria. A group determination criterion setting process will be described with reference to FIG. 9. FIG. 9 is a flowchart illustrating an example of the flow of a group determination criterion setting process according to this example.

Figure 9:
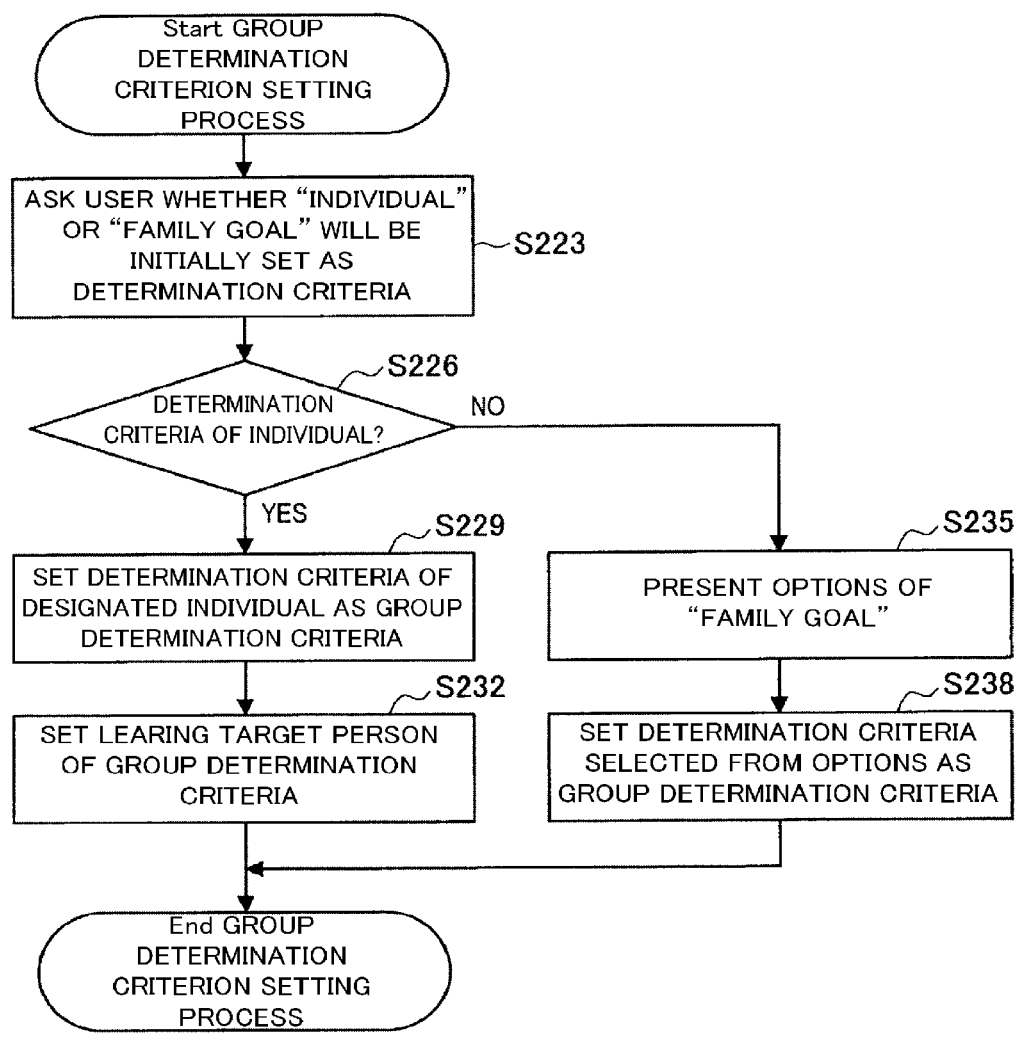
FIG. 9 is a flowchart illustrating an example of the flow of a group determination criterion setting process according to the second example of the present embodiment.

As illustrated in FIG. 9, first, the group agent 20 asks the user whether either "individual" or "family goal (preset goal determination criterion)" will be initially set as the determination criterion (step S223). The inquiry to the user may be realized from the display unit 240 or the speaker 250 of the group agent terminal 2 and may be realized from the display unit 140 or the speaker 150 of the personal agent terminal 1 by the personal agent 10 of the user registered in the group.

Subsequently, when the determination criteria of an individual (that is, a specific user belonging to the group) are selected (step S226: Yes), the group agent 20 sets the personal determination criteria of the designated specific user as the group determination criteria (step S229). For example, when the personal determination criteria (that is, the values of the father) of a father are selected, the group agent 20 acquires information on the personal determination criterion (the father's own determination criteria) stored in the personal agent 10A of the father. In this case, information set to be closed in the personal agent 10A among the personal determination criteria may not be acquired.

Subsequently, the group agent 20 sets a learning target person of the set group determination criteria (step S232). The learning target person may be the individual (that is, "father") or may be a specific user in the group (for example, "father and mother") and may be all members of the group. The group agent 20 can update the set group determination criteria on the basis of a feedback or the like of a predetermined learning target person and can perform learning so that the group determination criteria gradually conform to the values of the predetermined learning target person. Updating of the group determination criteria according to the feedback of the specific user will be described later with reference to FIG. 10.

On the other hand, when "family goal" is selected (step S226: No), the group agent 20 presents a plurality of determination criteria (goal determination criteria) prepared as presets as options (step S235).

Subsequently, the group agent 20 sets the selected determination criteria (goal determination criteria) as the group determination criteria (step S238). Since the group determination criteria are set as a goal, the group agent 20 does not change (that is, fixes) the group determination criteria from changing without being influenced from the feedback of the specific user.

Next, an operation process when the group determination criteria are updated according to the feedback of the specific user (a set learning target person) will be described with reference to FIG. 10.

Figure 10:
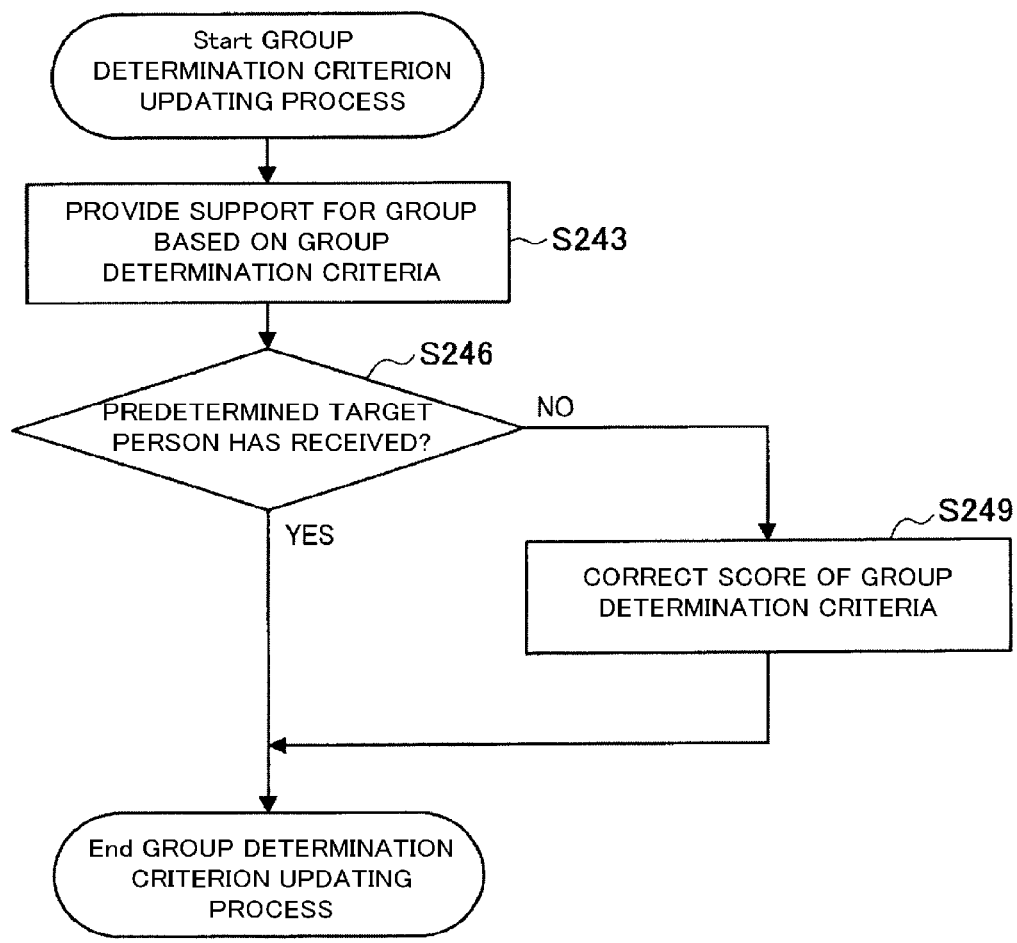
FIG. 10 is a flowchart illustrating an example of the flow of a group determination criterion updating process according to the second example of the present embodiment.

FIG. 10 is a flowchart illustrating an example of the flow of a group determination criterion updating process according to this example.

As illustrated in FIG. 10, first, the group agent 20 provides support for the group on the basis of the group determination criteria (step S243). Specifically, the group agent 20 supports shopping at a store that prioritizes "cheapness" according to group determination criteria in the purchase of ingredients for dinner, for example.

Subsequently, the group agent 20 determines whether a predetermined target person (that is, the learning target person set in step S232) has accepted the support (step S246). Whether the support is accepted may be determined by directly asking a question such as "are you satisfied with this support?" and may be determined on the basis of whether the target person has taken an action according to the support.

When the support is not accepted (step S246: No), the group agent 20 corrects the score of the group determination criteria (step S249). For example, the score of the corresponding item is lowered (when a score of 0 to 1 is assigned, the lower limit is set to 0). Moreover, a question such as "what will be prioritized in the future" may be asked, and the score of the other items may be raised (when a score of 0 to 1 is assigned, the upper limit is set to 0).

3-3. Third Example (Generation of New Group Agent 20 Due to Marriage or the Like)

Next, a case where a new group is generated due to marriage or the like will be described. If users before marriage belong to groups such as families, when a new group is generated due to marriage, the group determination criteria of the groups to which the users belonged may be merged to set the group determination criteria of a new group. For example, among a plurality of group determination criteria to be merged, the common parts and those present in only one group may be adopted, and different parts may be set to a flat value or may be selected by the users.

When a new group is generated on the basis of a plurality of groups, the group agent terminal 2 may acquire the group determination criterion data of the previous groups from the agent server 6 and may acquire the group determination criterion data of the previous groups from the personal agent terminal 1 belonging to the new group. Alternatively, when a group agent terminal on which the previous group agent operates is present in a network area, the group agent terminal 2 may acquire the group determination criterion data from the group agent terminal. The group agent terminal 2 sets the group determination criteria of the new group on the basis of the group determination criterion data acquired in this manner. Hereinafter, detailed description will be provided with reference to FIG. 11.

Figure 11:
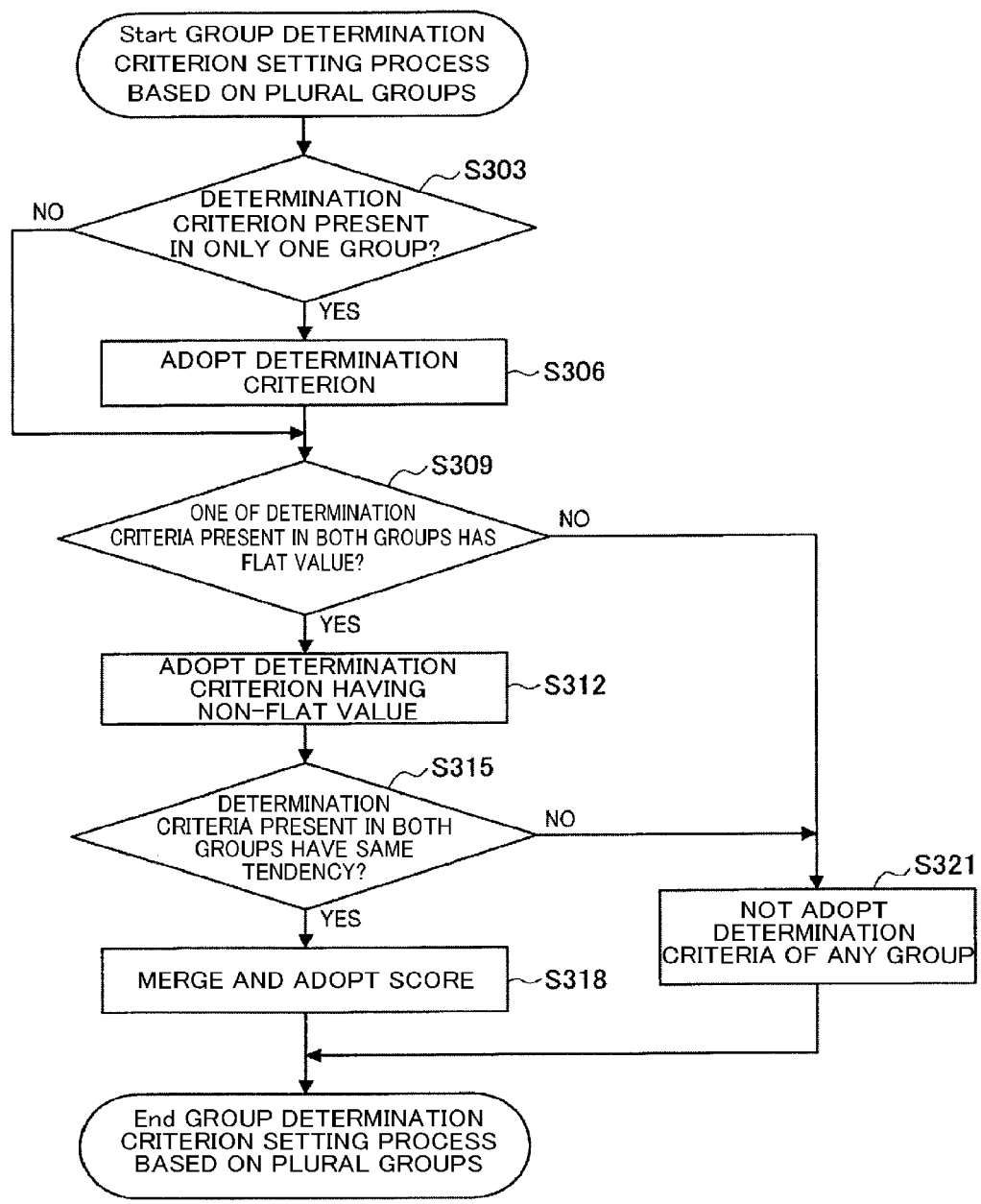
FIG. 11 is a flowchart illustrating an example of the flow of a group determination criterion setting process based on a plurality of groups according to a third example of the present embodiment.

FIG. 11 is a flowchart illustrating an example of the flow of a group determination criterion setting process based on a plurality of groups according to this example.

As illustrated in FIG. 11, first, when a determination criterion is present in only one group (step S303: Yes), the group determination criterion management unit 203 of the group agent terminal 2 adopts the determination criterion (step S306).

Subsequently, when one of the determination criteria present in both groups has a flat value (step S309: Yes), the group determination criterion management unit 203 adopts the determination criteria having non-flat values (step S312).

In this way, it is possible to adopt the determination criterion unique to the group among the determination criteria present in a plurality of groups to be referenced.

Subsequently, when the determination criteria present in both groups have the same tendency (step S315: Yes), the group determination criterion management unit 203 merges and adopts the scores of each item of the determination criteria (step S318). The determination criteria having the same tendency mean that the directions of the determination criteria are the same. For example, in the case of "food shopping determination criteria" as illustrated in Table 4, when both groups have the highest score for "deliciousness", the next highest score for "safety", and the lowest score for "cheapness", it can be said that the determination criteria have the same direction even if the specific scores of the respective items are not the same. In this case, the group determination criterion management unit 203 merges (for example, averages) the scores of the respective items and adopts the same as group determination criteria.

On the other hand, when all determination criteria present in both groups are not flat (step S309: No), or when the determination criteria present in both groups have different tendencies (step S315: No), the group determination criterion management unit 203 does not adopt the determination criteria of any group and does not generate the determination criteria (step S321).

The group determination criterion management unit 203 performs the processing illustrated in steps S303 to S321 for respective determination criteria. When the personal information of the user is included in the group determination criteria, a user may select whether or not to take over the personal information to a new group.

When a new group agent 20 is generated due to marriage or the like, the group determination criteria of the new group agent 20 may be generated on the basis of the personal determination criteria of the personal agents 10 of the respective users who are a married couple. In this case, the group agent terminal 2 may adopt a determination criterion present in only one user, a determination criterion which is not flat when that of one user is flat, and a determination criterion having the same tendency as the group determination criteria on the basis of the personal determination criteria of the married couple.

3-4. Fourth Example (Cancellation of Group Agent 20 Due to Divorce or the Like)

Next, when canceling a group due to divorce or the like (removing the personal agent 10 used by the user from a belonging group), the following options may be selected.

The user returns to a group to which the user belonged before. For example, divorced users may return to their parents. The personal agent 10 of the user is removed from the present group and rejoins the group of the user's parents. Rejoining to the group of the parents may be performed by presenting the information of an old group when leaving the new group and may be performed according to the user's operation.

The user joins a new group taking over the present group. For example, one parent who takes over a child may live independently. The personal agents 10 of the user and the child are removed from the present group and join a new group taking over the group determination criteria of the present group. In this case, parts of the group determination criteria may be taken over and the taken-over group determination criteria may be corrected. Hereinafter, detailed description will be provided with reference to FIGS. 12 to 14.

(Case of Returning to Previous Group)

Figure 12:
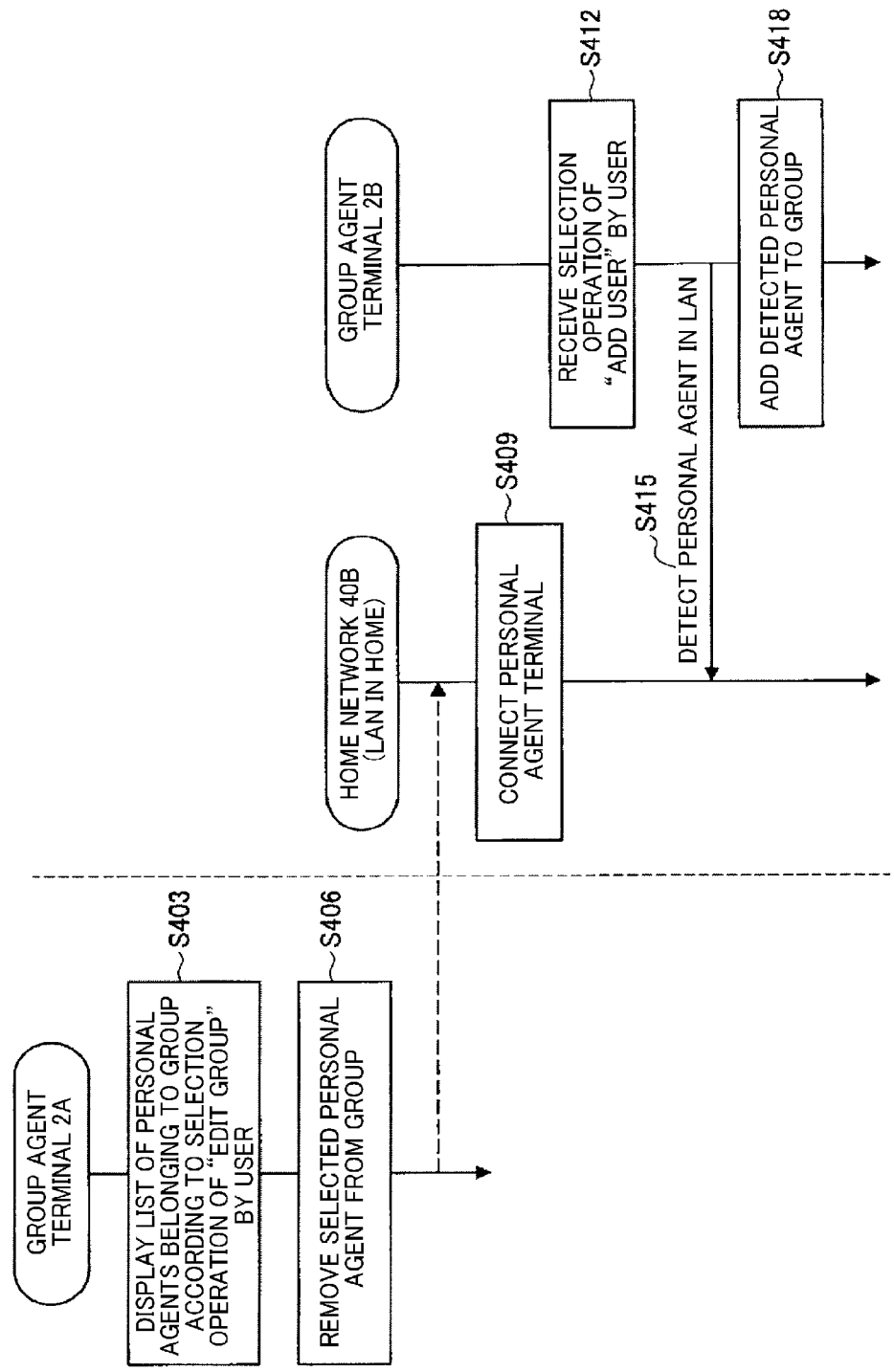
FIG. 12 is a flowchart illustrating an example of the flow of an operation process when a personal agent is removed from a group and returns to a previous group according to a fourth example of the present embodiment.

FIG. 12 is a flowchart illustrating an example of the flow of an operation process when a personal agent is removed from a group and returns to a previous group according to this example. Here, as an example, a case in which, although the personal agent 10A of a husband and the personal agent 10B of a wife belong to the group agent 20 (the group agent terminal 2A) of a family, at least one of the personal agents 10 needs to be removed from the group agent 20 will be considered.

As illustrated in FIG. 12, first, the group agent terminal 2A on which the group agent 20 operates displays a list of personal agents belonging to a group according to a selection operation of "edit group" by the user (step S403). The selection operation may be performed using the operation input unit 220 and the display unit 240 of the group agent terminal 2A and may be performed using the operation input unit 120 and the display unit 140 of the personal agent terminal 1 of the user communicating with the group agent terminal 2A. The list of the personal agent belonging to the group shows the personal agent 10A of the husband and the personal agent 10B of the wife as an example.

Subsequently, the group agent terminal 2 performs a process of removing the personal agent selected from the list from the group (step S406). For example, when the personal agent 10B of the wife is selected, the group agent terminal 2 removes the personal agent 10B from the family group (the family group agent 20) (for example, the information on the personal agent terminal 1*b* on which the personal agent 10B operates is removed from the group agent terminal 2A and cooperation with the personal agent 10B is canceled).

Such an operation of canceling an agent from the group may be performed by the side (the side remaining in the group) removing an agent from the group and may be performed by the side removed from the group.

Subsequently, the user (for example, "former wife") removed from the group connects the personal agent terminal 1*b* to the home network 40B of the user's parents in order to connect to the group agent terminal 2B used at the parent's home when the user returns to the user's parents, for example, to join another group (step S409).

Subsequently, when a selection operation of "add user" by the user is received (step S412), the group agent terminal 2B detects a personal agent present in the LAN (step S415).

The group agent terminal 2B adds the detected personal agent to the group (step S418). Addition to the group may be performed automatically and may be performed on the basis of the user's operation.

Hereinabove, processing when the group agent 20 to which the personal agent belongs is changed due to divorce or the like will be described in detail.

(Case of Taking Over Group Determination Criteria)

Next, a case of belonging to a new group taking over the present group will be described with reference to FIG. 13. For example, this is useful when one parent who takes over a child lives independently, and it is possible to use a new group agent taking over the values of a group agent that the parent has used.

Figure 13:
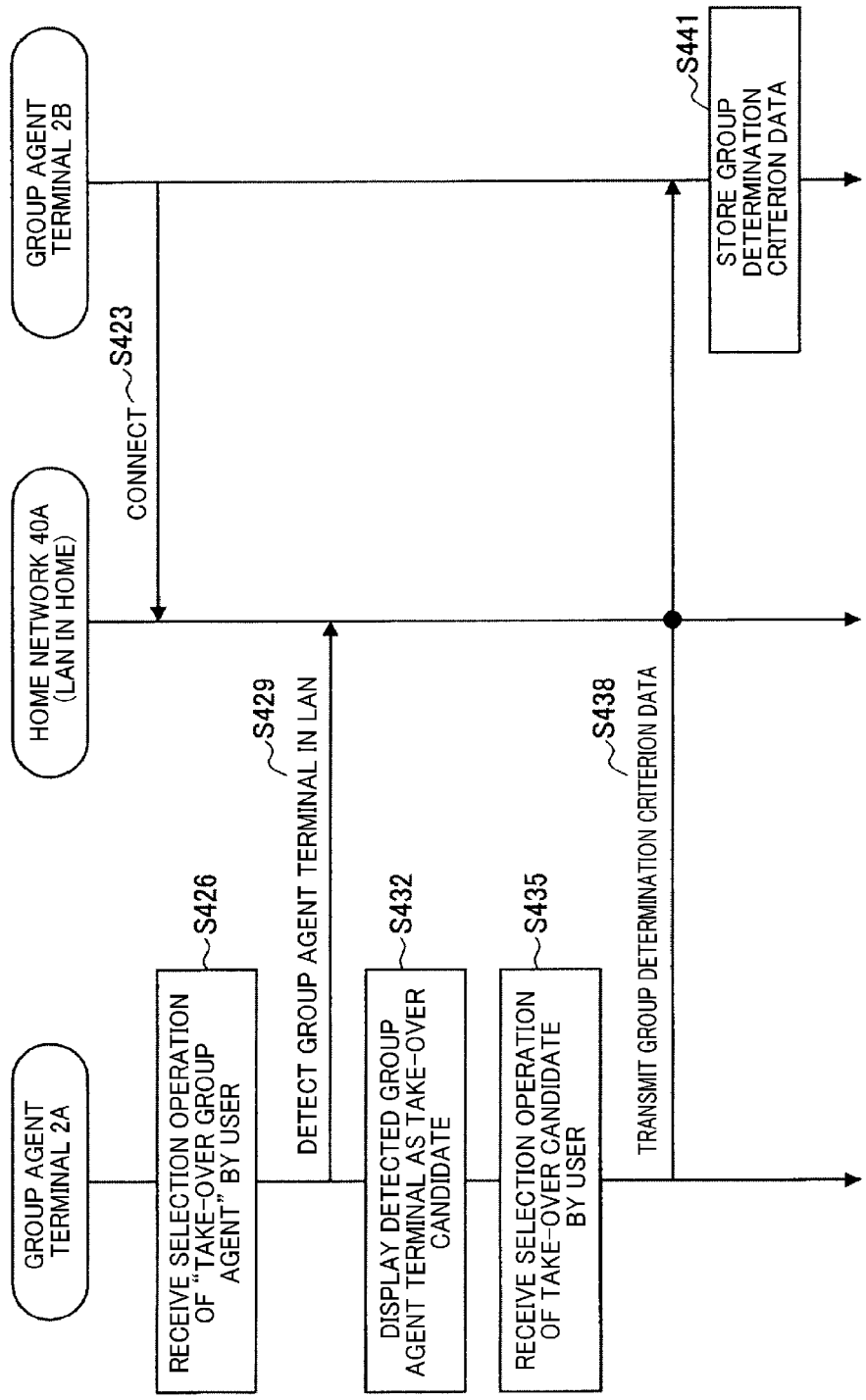
FIG. 13 is a flowchart illustrating an example of the flow of an operation process related to take-over of a group determination criterion according to the fourth example of the present embodiment.

FIG. 13 is a flowchart illustrating an example of the flow of an operation process related to taking over of group determination criteria according to this example. Here, as an example, a case in which group determination criteria are taken over from the group agent terminal 2A used by a married couple to the group agent terminal 2B used by the child and the wife who leaves home after divorce (that is, the values of the group agent are taken over) will be described.

As illustrated in FIG. 13, first, a user (for example, "former wife") connects the group agent terminal 2B to be used newly to the home network 40A in order for take-over from the group agent terminal 2A (step S423).

Subsequently, when a selection operation of "group agent take-over" by the user is received (step S426), the group agent terminal 2A detects a group agent terminal in the LAN (step S429).

Subsequently, the group agent terminal 2A displays the detected group agent terminal 2B as a take-over candidate (step S432).

Subsequently, when a selection operation of a take-over candidate by the user is received (step S435), the group agent terminal 2A transmits the group determination criterion data to the group agent terminal 2B via the home network 40A (step S438).

The group agent terminal 2B stores the received group determination criterion data (step S441). In this way, it is possible to take over the values to the new group agent.

(Case of Correcting During Take-Over)

Figure 14:
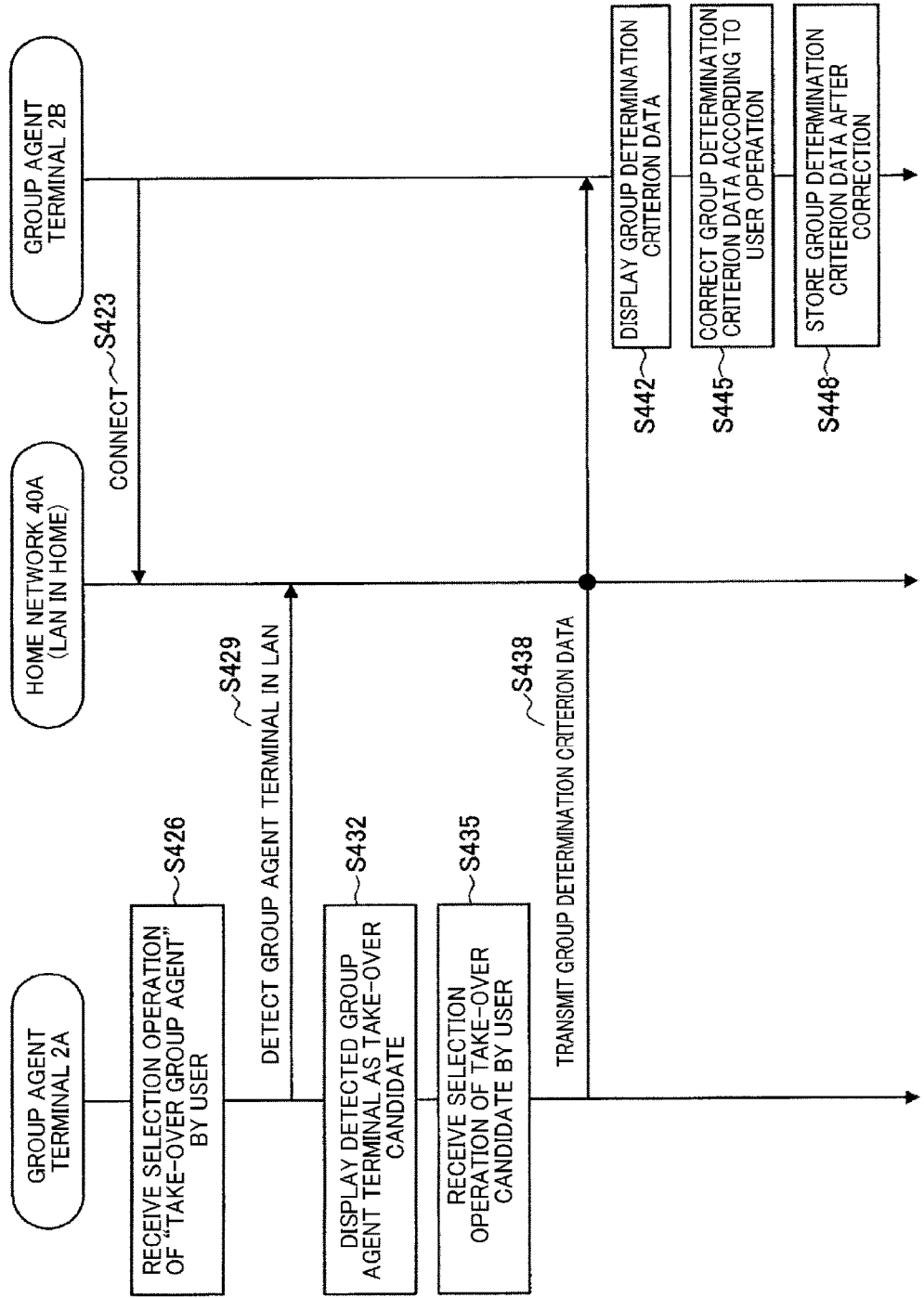
FIG. 14 is a flowchart illustrating an example of the flow of an operation process of correcting a part thereof when the group determination criterion is taken over according to the fourth example of the present embodiment.

Next, a case of correcting a part of the values when the values are taken over to a new group agent will be described with reference to FIG. 14. FIG. 14 is a flowchart illustrating an example of the flow of an operation process of correcting a part of group determination criteria when the group determination criteria are taken over according to this example.

Since the processing of steps S423 to S438 illustrated in FIG. 14 is the same as the processing of the same reference signs illustrated in FIG. 13, the description thereof will be omitted.

Subsequently, the new group agent terminal 2B having received the group determination criterion data from the group agent terminal 2A displays the group determination criterion data (step S442). The user (for example, the former wife using the group agent terminal 2B) can check the displayed group determination criterion data and correct the score and delete the determination criterion data as necessary.

Specifically, the group agent terminal 2B corrects the group determination criterion data according to the user's operation (step S445) and stores the group determination criterion data after correction (step S448).

In this way, it is possible to correct and use the taken-over values of the group agent according to the user's preference.

<3-5. Fifth Example (when User Belonging to Group Dies)>

Next, regarding how to handle the personal agent 10 of a user when the user belonging to a group dies, the following options can be selected.

The personal agent 10 is deleted (initialized).

The personal agent 10 is made accessible or the personal determination criterion data of the personal agent 10 is stored and made available. (That is, the values of the personal agent 10 are retained and used as necessary. In this way, for example, when the user asks "what would a grandfather say?", the group agent 20 presents an advice according to the personal determination criterion data of "grandfather" who has already died so that the user can look up the determination of the grandfather.)

The personal agent 10 is promoted to a group agent. (For example, when a deceased user is a person who acts as a model, the personal agent of the user is promoted to a group agent, and the personal agent provides support for the group in the future. The personal agent 10 to be promoted to a group agent is not limited to a personal agent of a deceased user but a personal agent of an existing user may be promoted to a group agent.)

Hereinafter, detailed description will be provided with reference to FIGS. 15 to 17.

(Deletion of Personal Agent)

Figure 15:
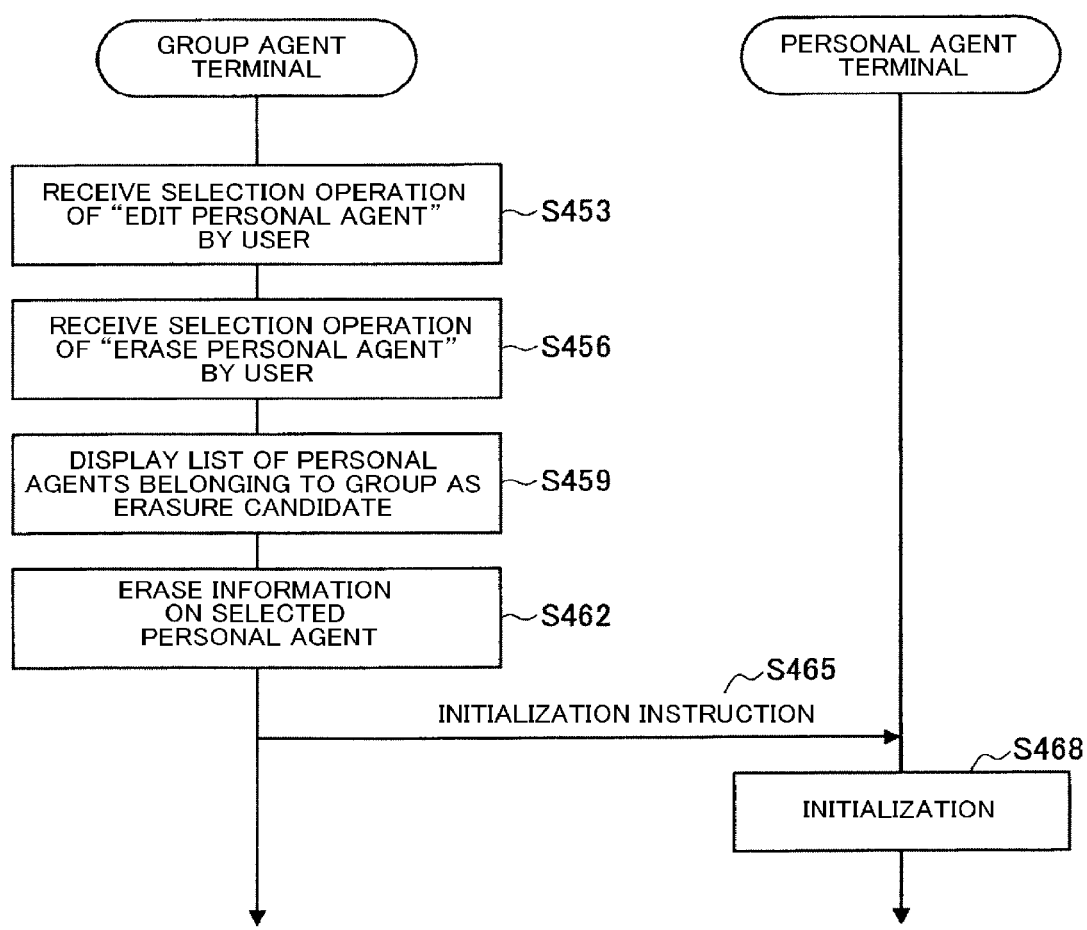
FIG. 15 is a flowchart illustrating an example of the flow of an operation process when a personal agent is deleted due to death according to a fifth example of the present embodiment.

FIG. 15 is a flowchart illustrating an example of the flow of an operation process when a personal agent is deleted due to death according to this example.

As illustrated in FIG. 15, first, the group agent terminal 2 receives a selection operation of "edit personal agent" by the user (step S453). Here, for example, a case in which another member operates the terminal after a grandfather belonging to the group dies will be considered.

Subsequently, when a selection operation of "erase personal agent" by the user is received (step S456), the group agent terminal 2 displays a list of personal agents belonging to the group as an erasure candidate (step S459). For example, the personal agents of a grandfather, a father, a mother, a daughter, and a son included in the family group are displayed. For example, the user selects the personal agent of a deceased grandfather as an erasure target.

Subsequently, the group agent terminal 2 erases the information on the selected personal agent (step S462).

Subsequently, the group agent terminal 2 sends an instruction to initialize the personal agent terminal 1 of the selected personal agent (step S465) and initialization of the personal agent terminal 1 is executed (step S468). The initialized personal agent terminal 1 becomes an available terminal.

(Read-Only of Personal Agent)

Figure 16:
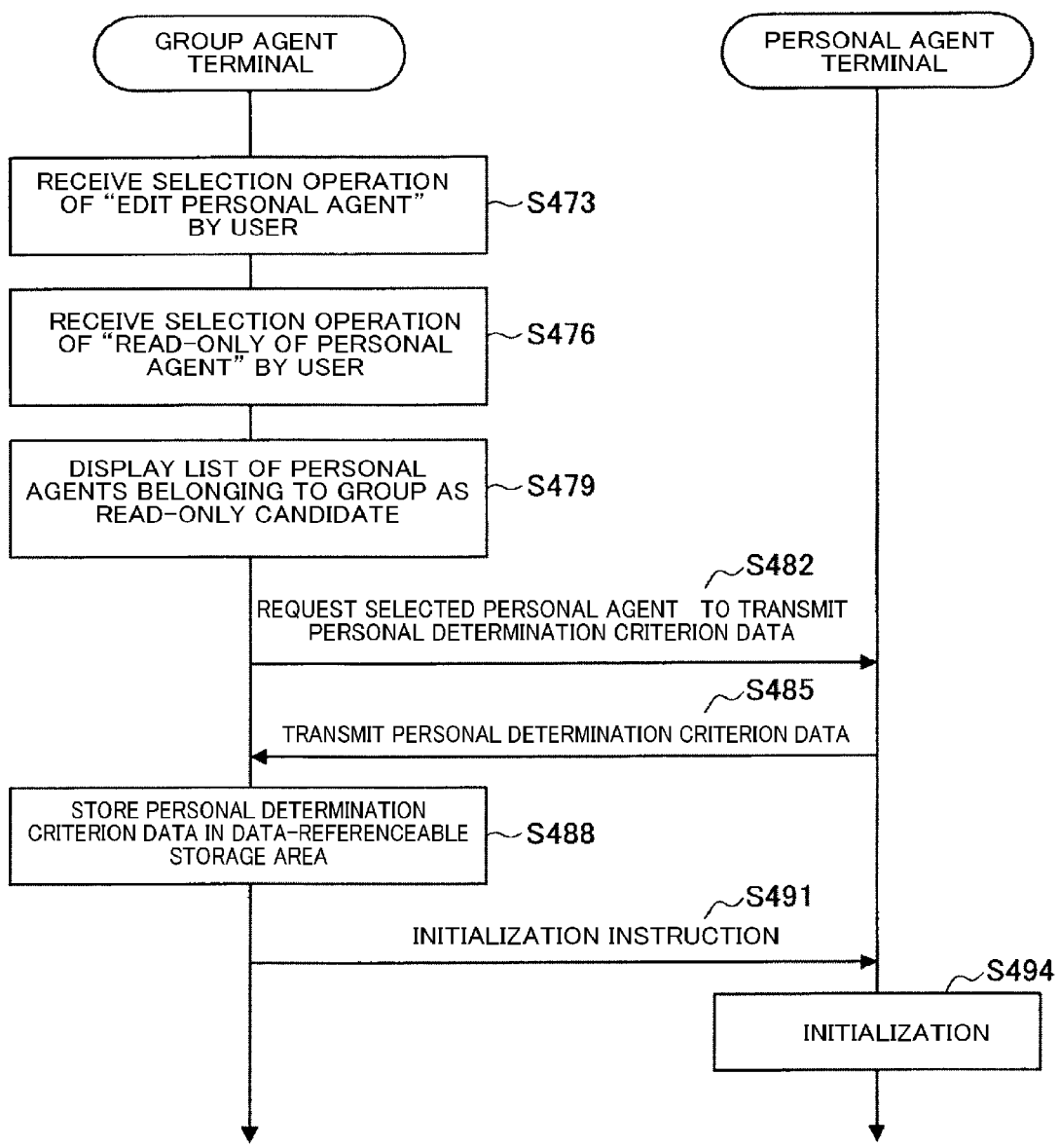
FIG. 16 is a flowchart illustrating an example of the flow of an operation process when a personal agent of a deceased user is used for read-only according to a fifth example of the present embodiment.

FIG. 16 is a flowchart illustrating an example of the flow of an operation process when a personal agent of a deceased user is used for read-only according to this example.

As illustrated in FIG. 16, first, the group agent terminal 2 receives a selection operation of "edit personal agent" by the user (step S473). Here, for example, a case in which another member operates the terminal after a grandfather belonging to the group dies will be considered. In response to a selection operation of "edit personal agent", the group agent terminal 2 displays a screen showing menus for editing the personal agent. The menu screen may include a menu for "read-only of personal agent".

Subsequently, the group agent terminal 2 receives a selection operation of "read-only of personal agent" by the user (step S476).

Subsequently, the group agent terminal 2 displays a list of personal agents belonging to the group as a read-only candidate (step S479).

Subsequently, the group agent terminal 2 requests the personal agent (specifically, the personal agent terminal 1 on which the personal agent operates) selected by the user to transmit the personal determination criterion data (step S482). Here, as an example, a case in which a personal agent of a deceased grandfather is selected by a member of a family group will be considered.

Subsequently, the personal agent terminal 1 transmits the personal determination criterion data to the group agent terminal 2 according to the request (step S485).

Subsequently, the group agent terminal 2 stores the received personal determination criterion data in a storage area (for example, the storage unit 260 of the group agent terminal 2) from which the group agent terminal 2 can reference data (step S488).

The group agent terminal 2 sends an instruction to initialize the personal agent terminal 1 of the selected personal agent (step S491) and initialization of the personal agent terminal 1 is executed (step S494). In this way, it is possible to initialize and use the personal agent terminal 1 of a deceased user and make the personal agent 10 used by the user read-only (that is, the personal determination criterion data of the personal agent 10 is stored on the group agent 20 so that the values of the user are retained and used for supporting the group (for example, asking for advice such as "how would a grandfather have determined?")). When the personal determination criterion data is stored on the group agent 20, information set to be closed (during his/her life) may be erased without being stored.

When providing group support, the group agent 20 may use the personal agent 10 of an existing user as appropriate. For example, when requesting a user for a certain task for group support, the request may be sent to a suitable user by referring to personal determination criteria of respective users.

(Promotion to Group Agent)

Figure 17:
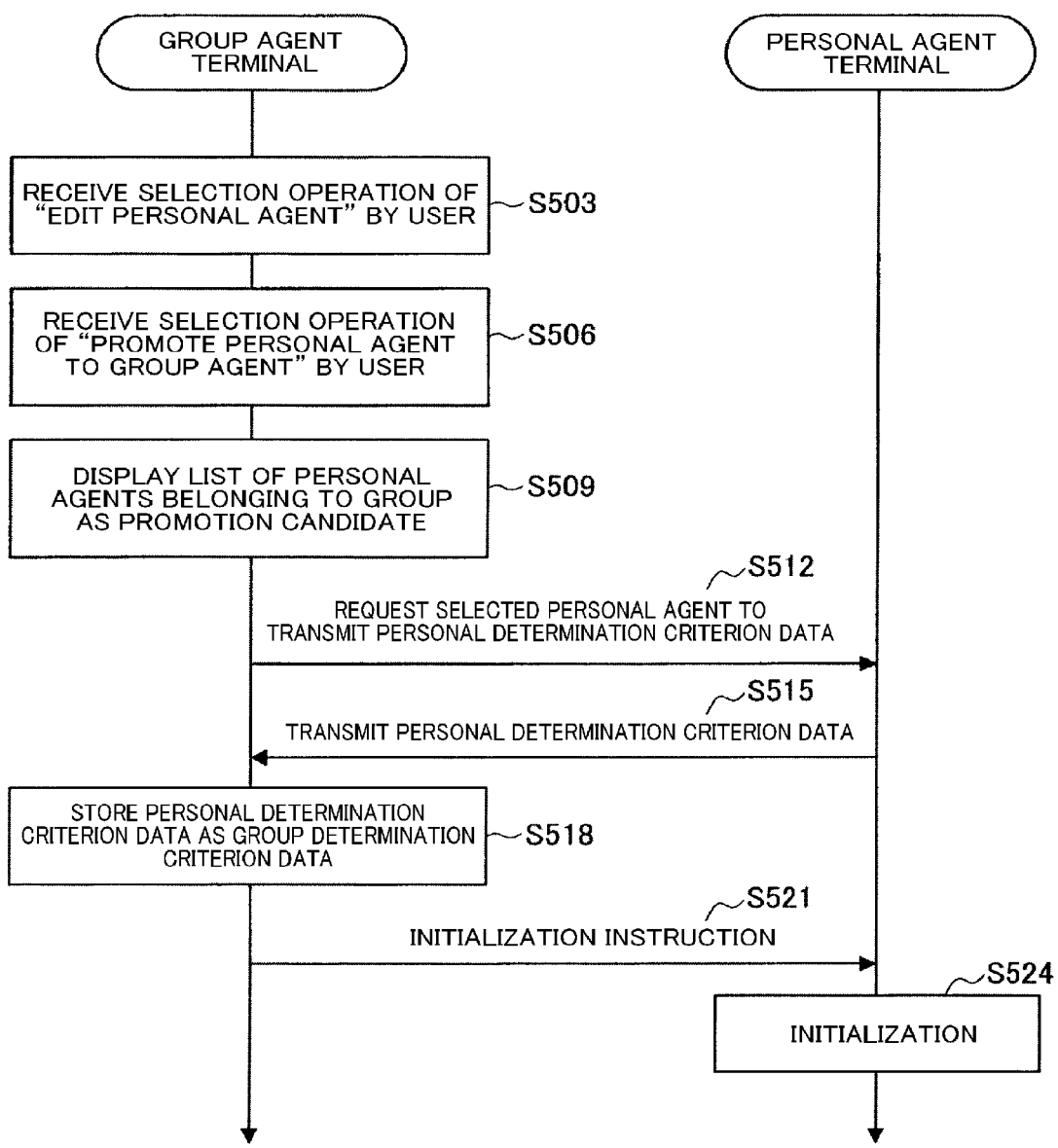
FIG. 17 is a flowchart illustrating an example of the flow of an operation process when a personal agent of a deceased user is promoted to a projected area according to the fifth example of the present embodiment.

FIG. 17 is a flowchart illustrating an example of the flow of an operation process when a personal agent of a deceased user is promoted to a group agent according to this example.

As illustrated in FIG. 17, first, the group agent terminal 2 receives a selection operation of "edit personal agent" by the user (step S503). Here, for example, a case in which another member operates the terminal after a grandfather belonging to the group dies will be considered. In response to a selection operation of "edit personal agent", the group agent terminal 2 displays a screen showing menus for editing the personal agent. The menu screen may include a menu for "promote personal agent to group agent".

Subsequently, the group agent terminal 2 receives a selection operation of "promote personal agent to group agent" by the user (step S506).

Subsequently, the group agent terminal 2 displays a list of personal agents belonging to the group as a promotion candidate (step S509).

Subsequently, the group agent terminal 2 requests the personal agent (specifically, the personal agent terminal 1 on which the personal agent operates) selected by the user to transmit the personal determination criterion data (step S512). Here, as an example, a case in which a personal agent of a deceased grandfather is selected by a member of a family group will be considered.

Subsequently, the personal agent terminal 1 transmits the personal determination criterion data to the group agent terminal 2 according to the request (step S515).

Subsequently, the group agent terminal 2 stores the received personal determination criterion data (for example, in the storage unit 260 of the group agent terminal 2) as group determination criterion data (step S518).

The group agent terminal 2 sends an instruction to initialize the personal agent terminal 1 of the selected personal agent (step S521) and initialization of the personal agent terminal 1 is executed (step S524). In this way, it is possible to initialize and use the personal agent terminal 1 of a deceased user and promote the personal agent 10 of the user to a group agent (that is, the personal determination criteria of the personal agent 10 are set as group determination criteria so that group support is performed using the values of the user). When the personal determination criterion data is stored on the group agent 20, information set to be closed (during his/her life) may be erased without being stored.

4. MODIFIED EXAMPLE

Next, a modified example of the information processing system according to the present embodiment will be described.

The group agent according to the present embodiment can generate a new group agent on the basis of a plurality of personal agents 10 (that is, group determination criteria can be set from a plurality of personal determination criteria). For example, when the group determination criteria are set initially, the group agent terminal 2 may automatically set so that the personal determination criteria of each user belonging to a group will be set using AND or using OR and may allow the user to select the same. When setting automatically, for example, the group agent terminal 2 may adopt a determination criterion present in only one person, non-flat determination criteria when the other determination criteria are flat, and determination criteria having the same tendency as the group determination criteria on the basis of the plurality of personal determination criteria.

In the information processing system according to the present embodiment, a child mode in which a child agent operates using the determination criteria of a parent agent or a family agent (group agent) associated therewith may be set in a child agent (for example, application to users under a predetermined age is recommended). Moreover, the child agent may not be personalized (that is, determination criteria are not corrected according to the child's feedback) during a period determined by the parent (for example, until a predetermined age).

In the information processing system according to the present embodiment, the personal agent may be regarded as a group agent, and the personal agent may act as a group agent (that is, the personal agent provides group support using the values of the personal agent). For example, which personal agent will be used as a group agent may be set depending on the standpoint (the position) of each user in a community (group) such that a mother agent in a family or a teacher agent in a school is used as the group agent. Alternatively, when the group agent is set initially, a personal agent regarded as a group agent may be designated.

The personal agent may belong to a plurality of groups. In this case, whether the schedule information of a user, hobby and preference information, and personal information in personal determination criterion data will be open or closed may be set depending on the group to which the user belongs. For example, a private schedule may be open to a family group but may be closed to a work group.

5. CONCLUSION

As described above, in the information processing system according to the present embodiment, the group agent can provide support for a group to which a plurality of users using a personal agent belongs.

While the preferred embodiments of the present disclosure have been described above with reference to the accompanying drawings, the present disclosure is not limited to the above examples. A person skilled in the art may find various alterations and modifications within the scope of the technical idea described in the claims, and it should be understood that they will naturally come under the technical scope of the present disclosure.

For example, a computer program for causing hardware such as a CPU, a ROM, and a RAM included in the personal agent terminal 1, the group agent terminal 2, or the agent server 6 to perform the functions of the personal agent terminal 1, the group agent terminal 2, or the agent server 6. A computer-readable storage medium having the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Note that, the following configurations also fall within the technical scope of the present disclosure.

(1)

An information processing system comprising:

a control unit that controls;

a personal agent personalized to a user; and a group agent that provides support for a group made up of a plurality of users corresponding to a plurality of the personal agents.

(2)

The information processing system according to (1), wherein the control unit sets any one of determination criteria based on information acquired from users and preset determination criteria as personal determination criteria of the personal agent.

(3)

The information processing system according to (1), wherein the control unit sets any one of personal determination criteria of a specific user and preset determination criteria as group determination criteria of the group agent.

(4)

The information processing system according to (2), wherein the control unit updates the personal determination criteria according to a feedback of the user with respect to a matter recommended by the personal agent according to the personal determination criteria.

(5)

The information processing system according to (3), wherein the control unit updates determination criteria of the group agent according to a feedback of a predetermined user with respect to a matter recommended by the group agent according to the group determination criteria.

(6)

The information processing system according to (5), wherein the control unit updates the group determination criteria according to a feedback of the specific user with respect to a matter recommended by the group agent according to the group determination criteria.

(7)

The information processing system according to (5), wherein the control unit updates the group determination criteria according to feedbacks of a plurality of users belonging to the group with respect to a matter recommended by the group agent according to the group determination criteria.

(8)

The information processing system according to (3), wherein the control unit fixes the group determination criteria when the preset determination criteria are set as the group determination criteria.

(9)

The information processing system according to (3), wherein the control unit sets at least a part of the personal determination criteria so as not to be applied to the group determination criteria.

(10)

The information processing system according to (9), wherein the control unit performs control so that information including a keyword set to be closed by the user among the personal determination criteria is not applied to the group determination criteria.

(11)

The information processing system according to any one of (1) to (10), wherein the control unit compares group determination criteria of a first group agent associated with a personal agent of a first user and group determination criteria of a second group agent associated with a personal agent of a second user, and the control unit associates a new group agent having determination criteria including common parts and parts present in only one group agent with the personal agent of the first user and the personal agent of the second user.

(12)

The information processing system according to (11), wherein the control unit deletes association between the personal agent of the first user and the new group agent and associates the first group agent with the personal agent of the first user.

(13)

The information processing system according to (11), wherein the control unit deletes association between the personal agent of the first user and the new group agent and takes over group determination criteria of the new group agent to another new group agent associated with the personal agent of the first user.

(14)

The information processing system according to any one of (1) to (13), wherein the control unit generates a new group agent on the basis of the personal agent belonging to the group.

(15)

The information processing system according to (14), wherein the control unit uses the personal determination criteria of the personal agent as the group determination criteria of the new group agent.

(16)

The information processing system according to any one of (1) to (15), wherein the control unit forms the group by associating the group agent with a plurality of the personal agents.

(17)

The information processing system according to any one of (1) to (16), wherein
the group agent accesses information that is open to another user by the user, and the personal agent accesses information that is not open to another user by the user.

(18)

An information processing method for causing a processor to control;
a personal agent personalized to a user; and
a group agent that provides support for a group made up of a plurality of users corresponding to a plurality of the personal agents.

(19)

A recording medium having a program recorded thereon, the program causing a computer to function as a control unit that controls;
a personal agent personalized to a user; and
a group agent that provides support for a group made up of a plurality of users corresponding to a plurality of the personal agents.

REFERENCE SIGNS LIST

1 Personal agent terminal
100 Control unit
101 Image recognition unit
102 Voice recognition unit
103 Personal determination criterion management unit
104 Personal support determining unit
105 Personal schedule management unit
106 Notification control unit
110 Communication unit
120 Operation input unit
130 Sensor unit
131 Position information acquisition unit
132 Camera
133 Mike
134 Acceleration sensor
135 Biosensor
140 Display unit
150 Speaker
160 Storage unit
2 Group agent terminal
200 Control unit
201 Image recognition unit
202 Voice recognition unit
203 Group determination criterion management unit
204 Group support determining unit
205 Group schedule management unit
206 Notification control unit
210 Communication unit
220 Operation input unit
230 Sensor unit
231 Camera
232 Mic (microphone)
240 Display unit
250 Speaker
260 Storage unit
3 IoT home appliance
4 Network
5a Schedule management server
5b Recipe service server
6 Agent server
10 Personal agent
20 Group agent
40A, 40B Home network

The invention claimed is:

1. An information processing system comprising:
a control circuit that controls:
a personal agent personalized to a user and configured to provide support to the user; and
a group agent that provides support for a group made up of a plurality of users corresponding to a plurality of personal agents by cooperating with the plurality of personal agents.

2. The information processing system according to claim 1, wherein
the control circuit sets any one of determination criteria based on information acquired from the plurality of users and preset determination criteria as personal determination criteria of the personal agent.

3. The information processing system according to claim 2, wherein the control circuit updates the personal determination criteria according to a feedback of the corresponding user of the plurality of users with respect to a matter recommended by the personal agent according to the personal determination criteria.

4. The information processing system according to claim 1, wherein
the control circuit sets any one of personal determination criteria of a specific user and preset determination criteria as group determination criteria of the group agent.

5. The information processing system according to claim 4, wherein
the control circuit updates determination criteria of the group agent according to a feedback of a predetermined user with respect to a matter recommended by the group agent according to the group determination criteria.

6. The information processing system according to claim 5, wherein the control circuit updates the group determination criteria according to the feedback of the predetermined user with respect to the matter recommended by the group agent according to the group determination criteria.

7. The information processing system according to claim 5, wherein
the control circuit updates the group determination criteria according to feedbacks of the plurality of users belonging to the group with respect to the matter recommended by the group agent according to the group determination criteria.

8. The information processing system according to claim 4, wherein
the control circuit fixes the group determination criteria when the preset determination criteria are set as the group determination criteria.

9. The information processing system according to claim 4, wherein
the control circuit sets at least a part of the personal determination criteria so as not to be applied to the group determination criteria.

10. The information processing system according to claim 9, wherein the control circuit performs control so that information including a keyword set to be closed by the specific user among the personal determination criteria is not applied to the group determination criteria.

11. The information processing system according to claim 1, wherein
the control circuit compares
group determination criteria of a first group agent associated with a personal agent of a first user, and group determination criteria of a second group agent associated with a personal agent of a second user, and associates a new group agent having determination criteria including common parts and parts present in only one group agent with the personal agent of the first user and the personal agent of the second user.

12. The information processing system according to claim 11, wherein the control circuit deletes association between the personal agent of the first user and the new group agent and associates the first group agent with the personal agent of the first user.

13. The information processing system according to claim 11, wherein the control circuit deletes association between the personal agent of the first user and the new group agent and takes over a group determination criteria of the new group agent to another new group agent associated with the personal agent of the first user.

14. The information processing system according to claim 1, wherein the control circuit is capable of generating a new group agent based on the personal agent belonging to the group.

15. The information processing system according to claim 14, wherein the control circuit uses the personal determination criteria of the personal agent as the group determination criteria of the new generated group agent.

16. The information processing system according to claim 1, wherein the control circuit forms the group by associating the group agent with the plurality of the personal agents.

17. The information processing system according to claim 1, wherein the group agent is capable of accessing information that is open to another user by the user, and the personal agent is capable of accessing information that is not open to another user by the user, as well.

18. An information processing method for causing a processor to control:

a personal agent personalized to a user and configured to provide support to the user; and a group agent that provides support for a group made up of a plurality of users corresponding to a plurality of the personal agents by cooperating with the plurality of personal agents.

19. A non-transitory computer-readable recording medium having a program recorded thereon, the program, when executed by a computer, causes the computer to function as a control circuit that controls:

a personal agent personalized to a user and configured to provide support to the user; and a group agent that provides support for a group made up of a plurality of users corresponding to a plurality of the personal agents by cooperating with the plurality of personal agents.

* * * * *